United States Patent
Oguma et al.

(10) Patent No.: US 6,911,627 B2
(45) Date of Patent: Jun. 28, 2005

(54) HEATING ELEMENT DEVICE, HEATING ELEMENT MOUNTED STRUCTURE, TEMPERATURE CONTROL CIRCUIT, TEMPERATURE CONTROL APPARATUS, AND MODULE

(75) Inventors: Takefumi Oguma, Tokyo (JP); Nobutaka Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/365,552

(22) Filed: Feb. 13, 2003

(65) Prior Publication Data

US 2003/0230566 A1 Dec. 18, 2003

(30) Foreign Application Priority Data

Feb. 14, 2002 (JP) ........................................ 2002-036790

(51) Int. Cl.[7] ................................................ H05B 1/02
(52) U.S. Cl. ...................... 219/483; 219/486; 219/495; 219/508; 219/538
(58) Field of Search ................................. 219/483–486, 219/530–545, 497, 501, 508, 494

(56) References Cited

U.S. PATENT DOCUMENTS

| 5,376,773 A | * 12/1994 | Masuda et al. ............. 219/543 |
| 5,973,299 A | * 10/1999 | Reader, Jr. .................. 219/486 |
| 6,172,343 B1 | * 1/2001 | Nothe et al. ................ 219/501 |

* cited by examiner

Primary Examiner—Mark Paschall
(74) Attorney, Agent, or Firm—Sughrue Mion, PLLC

(57) ABSTRACT

A heating element device has a laminate of a plurality of heating element plates, each of the heating element plates having an insulator and a resistor, which is capable of generating heat upon the supply of electric power, provided on the insulator. The plurality of heating element plates are each independently controllable with respect to energization. The heating element device also has a temperature detection plate having an insulator and a resistor, capable of undergoing a change in resistance value upon a change in temperature, provided on the insulator.

45 Claims, 9 Drawing Sheets

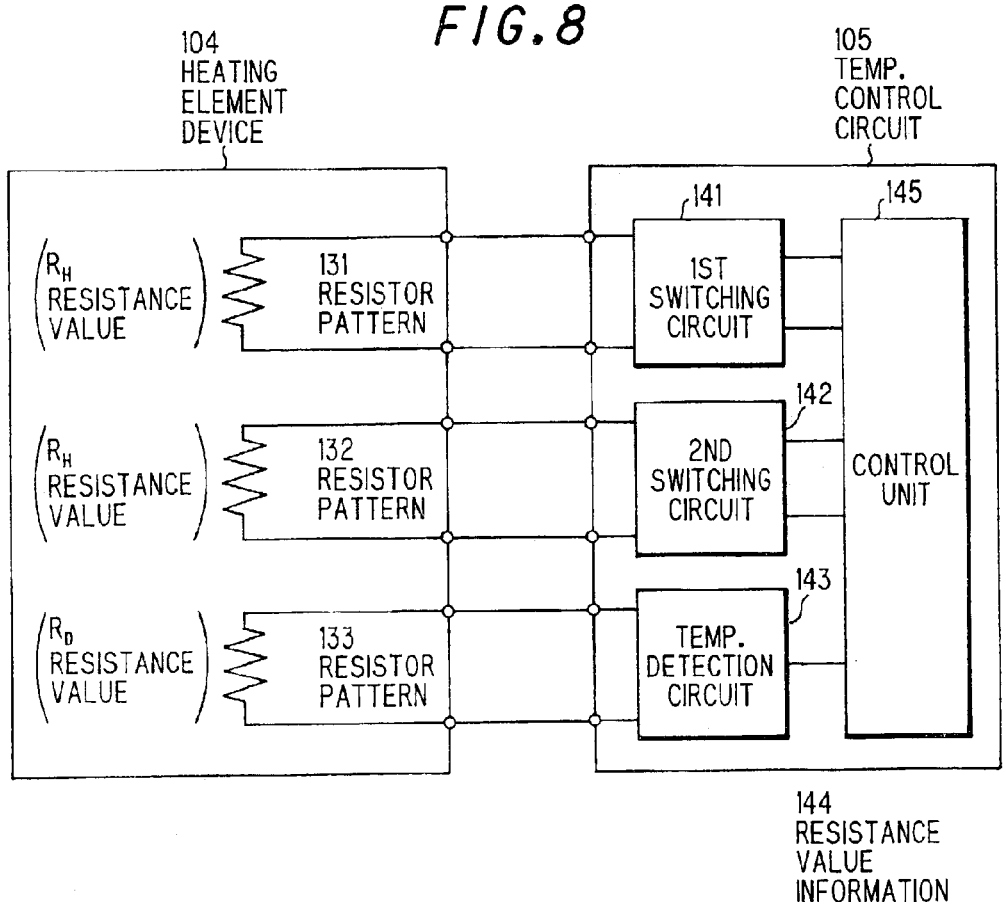
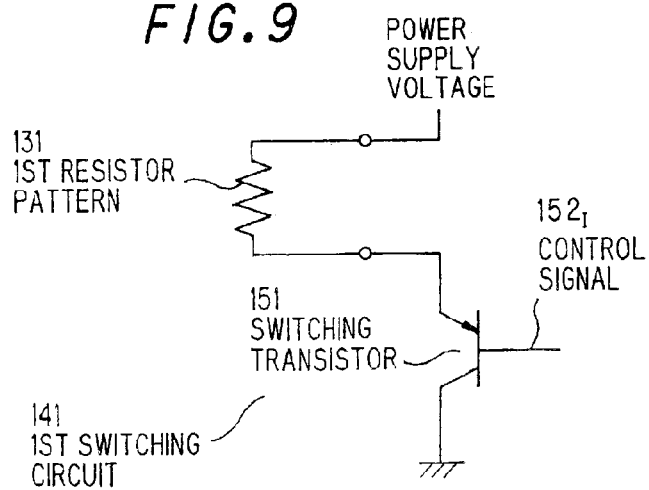

FIG. 11
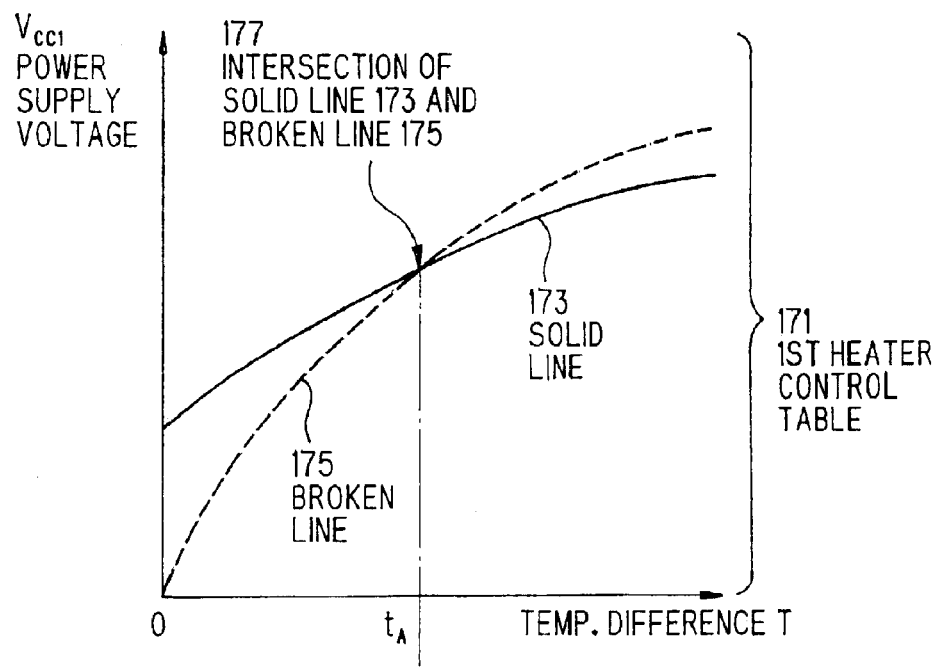
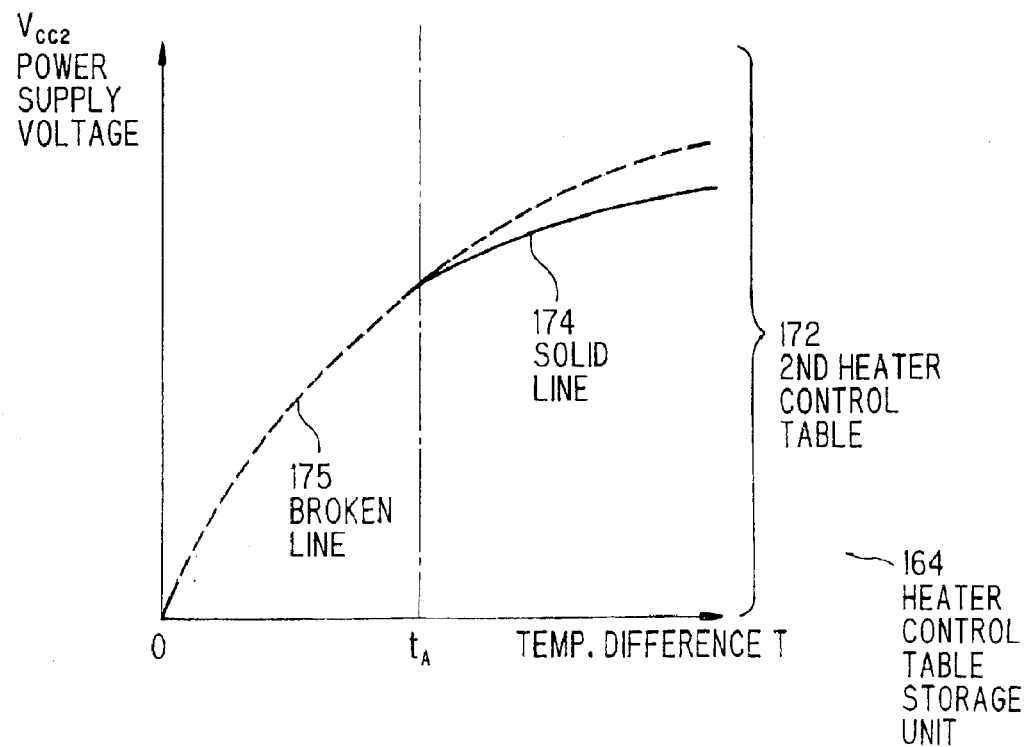

HEATING ELEMENT DEVICE, HEATING ELEMENT MOUNTED STRUCTURE, TEMPERATURE CONTROL CIRCUIT, TEMPERATURE CONTROL APPARATUS, AND MODULE

BACKGROUND OF THE INVENTION

1. Field of the Invention

The invention relates to a heating element device, which is brought into contact with an object to regulate the temperature of the object at a given temperature, a heating element mounted structure for the heating element device, a temperature control circuit for controlling the temperature of the heating element device, a temperature control apparatus including the heating element device and the temperature control circuit, and a module. More particularly, the invention relates to a heating element device, a heating element mounted structure, a temperature control circuit, a temperature control apparatus, and a module which are suitable for low power consumption purposes.

2. Description of the Related Art

Communication networks such as the Internet has explosively spread. This has led to a demand for further increased speed and capacity for backbone transmission systems called "backbone." DWDM (dense wavelength division multiplexing) for high-density multiplexing of light signals with different wavelengths has drawn attention as means useful for an increase in capacity. In DWDM, a large number of waveguide devices such as AWG (arrayed waveguide) for multiplexing/demultiplexing light are used as devices for processing light signals. Stable operation of these waveguide devices is necessary for realizing dense wavelength division. To this end, the operation temperature should be kept constant. The temperature control of these waveguide devices is important for this.

On the other hand, an attempt to lower the power supply voltage has been made to realize low power consumption. For example, it is common practice to change a power supply voltage of 5 V (volts) to 3.3 V. In the above case, however, lowering the power supply voltage makes it difficult to ensure electric power for keeping the waveguide element constituting the waveguide device at a desired temperature. The reason for this will be explained by taking the voltage of 5 V and the voltage of 3.3 V as an example.

FIG. 1 shows a heater which is subjected to on-off control by a transistor with a power supply voltage of 5 V. The collector-to-emitter voltage $V_{tr}$ of the transistor 11 of which the collector has been grounded is assumed to be 0.7 V. Further, it is assumed that a 3-Ω resistor 12 is used as a heater between the emitter in the transistor 11 and the power supply. In this case, the voltage $V_r$ across both ends of the resistor 12 is 4.3 V, a value obtained by subtracting the collector-to-emitter voltage $V_{tr}$ 0.7 V from the power supply voltage 5 V. The resistance value of the resistor 12 is R. The power consumption of the resistor 12 is $P_r$, and the current flowed through the resistor 12 is $I_C$. At that time, the power consumption $P_{r5V}$ of the resistor 12 can be calculated by equation (1):

$$P_{r5V} = I_c \times V_r = V_r^2 / R \quad (1)$$
$$= (5 - 0.7)^2 / 3$$
$$= 6.2 \text{ W (watts)}$$

On the other hand, FIG. 2 shows a heater which is subjected to on-off control by a transistor with a power supply voltage of 3.3 V. The collector-to-emitter voltage $V_{tr}$ of the transistor 11 of which the collector has been grounded is likewise 0.7 V because the collector-to-emitter voltage $V_{tr}$ can be regarded as being substantially kept at a fixed value even when the power supply voltage is varied. Likewise, a 3-Ω resistor 12 is provided as a heater between the emitter in the transistor 11 and the power supply $V_{CC}$. In this case, the power consumption $P_{r3.3V}$ of the resistor 12 can be calculated by equation (2):

$$P_{r3.3V} = I_c \times V_r = V_r^2 / R \quad (2)$$
$$= (3.3 - 0.7)^2 / 3$$
$$= 2.3 \text{ W (watts)}$$

In this way, assuming that the collector-to-emitter voltage of the transistor 11 is equal, when the power supply voltage is lowered from 5 V to 3.3 V, the quantity of heat generated from the resistor 12 as the heater is significantly reduced to 37% of the quantity of heat in the case of the power supply voltage 5 V. Therefore, when the power supply voltage is lowered in this way, the same quantity of heat as in the case of the power supply voltage 5 V cannot be generated without the provision of three sets of heaters shown in FIG. 2.

Mere provision of three sets of heaters, however, increases the mount area by at least three times. Therefore, the size of the temperature control apparatus provided with heaters is disadvantageously increased. Apart from this problem, the provision of a plurality of heaters poses an additional problem that the on-off control of the power supply of these heaters disadvantageously lowers thermal efficiency. This problem will be explained by taking the provision of two sets of identical heaters as an example for simplified explanation.

FIG. 3 shows the principal construction of a conventional temperature control apparatus. A temperature control apparatus 21 includes first and second heaters 22, 23 having a resistance of $R_H$ which are connected parallel to each other to constitute a parallel circuit. A switching transistor 24 of which the emitter and collector are connected between one end of the parallel circuit and a ground. A heater control circuit 26 is provided for supplying a control signal for switching to the base of the switching transistor 24 and for applying a power supply voltage to a power supply input terminal 25 in one end of the parallel circuit of the first and second heaters 22, 23. In this temperature control apparatus 21, the voltage across both ends of the parallel circuit of the first and second heaters 22, 23 will be hereinafter referred to as heater voltage $V_H$, and the collector-to-emitter voltage of the switching transistor 24 will be hereinafter referred to as switch-side voltage $V_{CE}$.

In such an initial state that an apparatus (not shown) of which the temperature is to be regulated has not been warmed yet, the temperature control apparatus 21 turns on (energizes) the switching transistor 24 and, in addition, applies the maximum permissible voltage to the power supply input terminal 25. As the temperature of the apparatus of which the temperature is to be regulated rises, the applied voltage is lowered. When the temperature has reached a desired temperature, the applied voltage is varied so as to keep that temperature. As soon as the temperature control of the apparatus has been completed, the switching transistor 24 is turned off (deenergized).

FIG. 4 shows the relationship between the set temperature and the power supply voltage applied to the temperature control apparatus shown in FIG. 3. When the set temperature required of the apparatus of which the temperature is to be regulated is higher, the power supply voltage applied to the power supply input terminal 25 in the temperature control apparatus 21 shown in FIG. 3 is higher.

FIG. 5 shows the relationship between the power supply voltage applied to the temperature control apparatus shown in FIG. 3 and the energy efficiency (the ratio between the power consumption of the heater and the power consumption of the whole temperature control apparatus). As explained above, the switch-side voltage $V_{CE}$ in the switching transistor 24 of the temperature control apparatus 21 is substantially a fixed value independently of the level of the voltage applied to the power supply input terminal 25, for example, about 0.7 V. The voltage obtained by subtracting the switch-side voltage $V_{CE}$ from the power supply voltage is a heater voltage $V_H$. Therefore, when the power supply voltage is low, a relatively larger voltage than the case where the power supply voltage is high is applied to the switching transistor 24 and is wastefully consumed. This means that the thermal efficiency is low.

When the power supply voltage applied to the power supply input terminal 25 is increased, the proportion of the electric power consumed by the switching transistor 24 is relatively reduced. As explained above, however, an attempt to lower the power supply voltage has been made to realize low power consumption. As shown in FIG. 5, when the energy efficiency is lower in a lower power supply voltage region, lowering the voltage does not satisfactorily contribute to a reduction in power consumption.

SUMMARY OF THE INVENTION

Accordingly, it is an object of the invention to provide a heating element device, a heating element mounted structure, a temperature control circuit, a temperature control apparatus, and a module, which can efficiently utilize a power supply even in the case of low drive voltage.

The above object can be attained by the following features of the invention.

(1) A heating element device comprising a laminate of a plurality of heating element plates, each of the heating element plates comprising an insulator and a resistor, capable of generating heat upon the supply of electric power, provided on the insulator, the plurality of heating element plates being each independently controllable with respect to energization.

In the heating element device in the item (1), a plurality of heating element plates each comprising an insulator and a resistor provided on the insulator are stacked on top of each other or one another and are each independently controlled with respect to energization by the supply of electric power to generate heat. According to this construction, since the resistors can be each independently controlled with respect to energization, the power supply can be efficiently utilized.

(2) A heating element device comprising a laminate of (i) a plurality of heating element plates, each of the heating element plates comprising an insulator and a resistor, capable of generating heat upon the supply of electric power, provided on the insulator, the plurality of heating element plates being each independently controllable with respect to energization, and (ii) a temperature detection plate comprising an insulator and a resistor, capable of undergoing a change in resistance value upon a change in temperature, provided on the insulator.

In the heating element device in the item (2), a plurality of heating element plates for heat generation and a temperature detection plate for detecting a temperature through the utilization of a change in resistance value are stacked to constitute the heating element device. According to this construction, the heating element plates can be each independently controlled with respect to energization according to the detected temperature to efficiently utilize the power supply.

(3) The heating element device according to the above item (1) or (2), wherein the plurality of heating element plates are different from each other or one another in a resistor pattern provided on the surface thereof.

In the heating element device in the item (3), the plurality of heating element plates stacked on top of each other or one another are different from each other or one another in the resistor pattern provided on the surface of the plate. According to this construction, generated heat can be dispersed in the facial direction.

(4) The heating element device according to the above item (1) or (2), wherein, in the plurality of heating element plates, the resistor is provided on one side of the insulator.

In the heating element device in the item (4), in the plurality of heating element plates, the resistor may be provided only on one side of the insulator. This construction is advantageous in that, even when the heating element plates are put on top of each other in such a manner that the resistor-nonmounted surface of one of the heating element plates is stacked directly on the resistor-mounted surface of another heating element plate, insulation between these heating element plates can be ensured.

(5) The heating element device according to the above item (1) or (2), wherein, in the plurality of heating element plates, the resistor is provided on both sides of the insulator.

In the heating element device in the item (5), in the plurality of heating element plates, the resistor is provided on both sides of the insulator. The provision of the resistor on both sides of the insulator can increase the heat generation per heating element plate. In this case, when the pattern provided on one side of the heating element plate is different from the pattern provided on the other side of the heating element plate, the dispersion of heat can be improved. Further, when the heating element on one side of the heating element plate is controlled independently of the heating element on the other side of the heating element plate, the number of heating elements for controlling heat generation can be substantially doubled.

(6) The heating element device according to the above item (4), wherein an insulator plate formed of an insulator is provided between each two of the plurality of heating element plates.

In the heating element device according to the item (6) the interposition of an insulator plate between the heating element plates can enhance the insulation of the heating element plates from each other and can improve the dispersion of heat in the facial direction.

(7) The heating element device according to the above item (5), wherein an insulator plate formed of an insulator is provided between each two of the plurality of heating element plates.

In the heating element device according to the item (7) the interposition of an insulator plate between the heating element plates can enhance the insulation of the heating element plates from each other and can improve the dispersion of heat in the facial direction.

(8) A heating element mounted structure comprising: (i) a board; (ii) the heating element device according to the above item (1) or (2) which has been fixed onto the board and can generate heat upon being energized; and (iii) an object fixed onto the heating element device and to be heated.

In the heating element mounted structure in the item (8), the heating element device according to the above item (1) or (2) is fixed onto a board such as a printed board and, in addition, an object to be heated is fixed onto the heating element device. According to this construction, an object to be heated can be simply mounted onto a printed board.

(9) A heating element mounted structure comprising: (i) a board; (ii) the heating element device according to the above item (1) or (2) which has been fixed onto the board and can generate heat upon being energized; (iii) a heat-conductive substrate fixed onto the heating element device; and (iv) an object fixed onto the heat-conductive substrate and to be heated.

In the heating element mounted structure in the item (9), the heating element device according to the above item (1) or (2) is fixed onto a board such as a printed board and, in addition, an object to be heated is fixed onto the heating element device through a heat-conductive substrate. According to this construction, an object to be heated can be simply mounted onto the printed board, and, at the same time, the use of the heat-conductive substrate can improve the dispersion of heat in the facial direction.

(10) A heating element mounted structure comprising: (i) a board; (ii) a heat-conductive substrate fixed onto the board through a support; (iii) the heating element device according to the above item (1) or (2) which has been fixed onto the surface of the heat-conductive substrate in its board side and can generate heat upon being energized; and (iv) an object to be heated which has been fixed onto the surface of the heat-conductive substrate remote from the heating element device.

In the heating element mounted structure in the item (10), a heat-conductive substrate is fixed onto a board such as a printed board through a support, and the heating element device according to the above item (1) or (2) and an object to be heated are fixed onto the heat-conductive substrate so as to sandwich the heat-conductive substrate between the heating element device and the object. According to this construction, heat generated from the heating element device can be evenly conveyed to the object to be heated. Further, the regulation of the length of the support so as for the heating element device to be located above and separated from the printed board can reduce the proportion of heat conveyed to the printed board side and can improve the thermal efficiency.

(11) A temperature control circuit comprising: (i) temperature data input means for inputting temperature data for measuring the temperature of an object to be heated; (ii) energization means for energizing a plurality of resistors capable of generating heat upon being energized independently of each other or one another; and (iii) switching means for changing the number of resistors to be energized in the plurality of resistors depending upon the temperature indicated by the temperature data fed by the temperature data input means and for controlling the resistors with respect to energization.

In the temperature control circuit in the item (11), temperature data for measuring the temperature of an object to be heated is input into the temperature control circuit to change the number of resistors to be energized in the plurality of resistors depending upon the temperature indicated by the temperature data, followed by energization control of these resistors. According to this construction, the power supply can be efficiently utilized even when the drive voltage is low.

(12) A temperature control circuit comprising: (i) temperature detection means for permitting the input of resistance values of a second resistor which, together with a plurality of first resistors capable of generating heat upon being energized, constitutes a laminate and for detecting, based on a change in the resistance value, the temperature of an object to be heated, the object having been fixed onto the laminate of the first and second resistors; (ii) energization means for energizing the plurality of first resistors independently of each other or one another; and (iii) switching means for changing the number of resistors to be energized in the plurality of first resistors depending upon the temperature detected by the temperature detection means and for controlling the first resistors with respect to energization.

In the temperature control circuit in the item (12), resistance values of a second resistor which, together with a plurality of first resistors capable of generating heat upon being energized, constitutes a laminate are input into the temperature detection means, and the temperature of the object, to be heated, fixed onto the laminate of the first and second resistors is detected based on a change in the resistance value of the second resistor. Further, switching means is provided between each of the plurality of first resistors and the energization means, and the number of resistors to be energized in the plurality of first resistors is properly varied according to temperature data received from the detection temperature input means. According to this construction, the power supply can be efficiently utilized even when the drive voltage is low.

(13) The temperature control circuit according to the above item (11), wherein the switching means reduces the number of resistors to be supplied with electric power in the plurality of resistors as the temperature of the object to be heated approaches a set temperature as a target value.

According to the temperature control circuit in the item (13), in the temperature control circuit in the above item (11), the switching means reduces the number of resistors to be supplied with electric power in the plurality of resistors as the temperature of the object to be heated approaches a set temperature as a target value. Therefore, even when the switching means has intrinsic resistance, the electric power can be efficiently controlled according to the necessary quantity of heat.

(14) The temperature control circuit according to the above item (12), wherein the switching means reduces the number of resistors to be supplied with electric power in the plurality of first resistors as the temperature of the object to be heated approaches a set temperature as a target value.

According to the temperature control circuit in the item (14), in the temperature control circuit in the above item (12), the switching means reduces the number of resistors to be supplied with electric power in the plurality of first resistors as the temperature of the object to be heated approaches a set temperature as a target value. Therefore, even when the switching means has intrinsic resistance, the electric power can be efficiently controlled according to the necessary quantity of heat.

(15) The temperature control circuit according to the above item (11), wherein the switching means reduces the number of resistors to be supplied with electric power in the plurality of resistors when a difference between the temperature of the object to be heated and the set temperature as the target value is smaller than a predetermined value.

According to the temperature control circuit in the item (15), in the temperature control circuit in the above item (11), the switching means reduces the number of resistors to be supplied with electric power in the plurality of resistors only when a difference between the temperature of the object to be heated and the set temperature as the target value has become smaller than a predetermined value. Until this stage, the control of temperature is carried out using the plurality of resistors. Therefore, a satisfactory quantity of heat can be obtained, and heat response is quick.

(16) The temperature control circuit according to the above item (12), wherein the switching means reduces the number of resistors to be supplied with electric power in the plurality of first resistors when a difference between the temperature of the object to be heated and the set temperature as the target value is smaller than a predetermined value.

According to the temperature control circuit in the item (16), in the temperature control circuit in the above item (12), the switching means reduces the number of resistors to be supplied with electric power in the plurality of first resistors only when a difference between the temperature of the object to be heated and the set temperature as the target value has become smaller than a predetermined value. Until this stage, the control of temperature is carried out using the plurality of first resistors. Therefore, a satisfactory quantity of heat can be obtained, and heat response is quick.

(17) A temperature control apparatus comprising: (i) a heating element device formed of a laminate of a plurality of resistors capable of generating heat upon being energized; (ii) an object to be heated, the object having been mounted directly or indirectly onto the heating element device; (iii) detection temperature input means for inputting the temperature of the object to be heated; (iv) energization means for energizing the plurality of resistors constituting the heating element device independently of each other or one another; and (v) switching means for changing the number of resistors to be energized in the plurality of resistors depending upon the temperature input by the detection temperature input means and for controlling the resistors with respect to energization.

In the temperature control apparatus in the item (17), the temperature control circuit in the above item (11) is used in the heating element device to constitute the temperature control apparatus.

(18) A temperature control apparatus comprising: (i) a heating element device formed of a laminate of a plurality of first resistors capable of generating heat upon being energized and a second resistor for detecting a change in resistance value caused by a change in temperature; (ii) an object to be heated, the object having been mounted directly or indirectly onto the heating element device; (iii) detection temperature input means for inputting the temperature of the object to be heated; (iv) energization means for energizing the plurality of first resistors constituting the heating element device independently of each other or one another; (v) detection temperature input means for inputting the resistance value of the second resistor; and (vi) switching means for changing the number of resistors to be energized in the plurality of first resistors depending upon the temperature input by the detection temperature input means and for controlling the resistors with respect to energization.

In the temperature control apparatus in the item (18), the temperature control circuit in the above item (12) is used in the heating element device to constitute the temperature control apparatus.

(19) The temperature control apparatus according to the above item (17), wherein the switching means reduces the number of resistors to be supplied with electric power in the plurality of resistors as the temperature of the object to be heated approaches a set temperature as a target value.

According to the temperature control apparatus in the item (19), in the temperature control apparatus in the above item (17), the switching means reduces the number of resistors to be supplied with electric power in the plurality of resistors as the temperature of the object to be heated approaches a set temperature as a target value. Therefore, even when the switching means has intrinsic resistance, the electric power can be efficiently controlled according to the necessary quantity of heat.

(20) The temperature control apparatus according to the above item (18), wherein the switching means reduces the number of resistors to be supplied with electric power in the plurality of first resistors when a difference between the temperature of the object to be heated and the set temperature as the target value is smaller than a predetermined value.

According to the temperature control apparatus in the item (20), in the temperature control apparatus in the above item (18), the switching means reduces the number of resistors to be supplied with electric power in the plurality of first resistors only when a difference between the temperature of the object to be heated and the set temperature as the target value has become smaller than a predetermined value. Until this stage, the control of temperature is carried out using the plurality of first resistors. Therefore, a satisfactory quantity of heat can be obtained, and heat response is quick.

(21) A temperature control apparatus comprising: (i) a plurality of heating elements for supplying thermal energy to a predetermined site; (ii) a plurality of switching circuits having respective intrinsic internal resistances which are provided in a one-to-one relationship with the plurality of heating elements; (iii) temperature detection means for detecting the temperature of the predetermined site; (iv) switching circuit driving form determination means for determining the on/off state of each switching circuit based on the relationship between the total thermal energy supplied to the predetermined site from all of the plurality of heating elements and energy loss derived from internal resistance of the switching circuit to be energized so that the proportion of the total thermal energy loss of all of the switching circuits relative to each temperature detected by the temperature detection means is minimized; and (v) switching circuit driving control means for controlling the on/off state of the plurality of switching circuits according to the temperature detected by the temperature detection means based on the result of determination in the switching circuit driving form determination means.

In the temperature control apparatus in the item (21), switching circuits are provided in a one-to-one relationship with the plurality of heating elements for supplying thermal energy to the predetermined site, and the switching circuit driving form determination means determines the on/off state of each switching circuit based on the relationship between the total thermal energy supplied to the predetermined site from all of the plurality of heating elements and energy loss derived from internal resistance of the switching circuit to be energized so that the proportion of the total thermal energy loss of all of the switching circuits relative to each temperature detected by the temperature detection means is minimized. This determination may be carried out each time when the temperature has been detected. Alternatively, for example, a table containing previously determined data may be provided. The on/off state of the plurality of switching circuits is controlled by the switching circuit driving control means according to the temperature detected by the temperature detection means based on the result of determination in the switching circuit driving form determination means. Thus, since the plurality of heating elements are not connected in parallel but are each independently energized, the resistance value of the heating element is not apparently lowered. Therefore, energy loss derived from the internal resistance of the switching circuit can be suppressed. Further, since these heating elements can be each independently driven, when the power consumption may be small, a method may be adopted wherein only a part of the heating elements is driven at a higher applied voltage than the case where all the heating elements are simultaneously driven. This also can suppress energy loss derived from the internal resistance of the switching circuit.

(22) A temperature control apparatus comprising: (i) a plurality of heating elements for supplying thermal energy to a predetermined site, the plurality of heating elements having been divided into a plurality of heating element groups; (ii) a plurality of switching circuits having respective intrinsic internal resistances which are provided in a one-to-one relationship with the plurality of heating element groups; (iii) temperature detection means for detecting the temperature of the predetermined site; (iv) switching circuit driving form determination means for determining the on/off state of each switching circuit based on the relationship between the total thermal energy supplied to the predetermined site from all of the plurality of heating elements and energy loss derived from internal resistance of the switching circuit to be energized so that the proportion of the total thermal energy loss of all of the switching circuits relative to each temperature detected by the temperature detection means is minimized; and (v) switching circuit driving control means for controlling the on/off state of the plurality of switching circuits according to the temperature detected by the temperature detection means based on the result of determination in the switching circuit driving form determination means.

In the temperature control apparatus in the item (22), switching circuits are provided in a one-to-one relationship with the plurality of heating element groups for supplying thermal energy to the predetermined site, and the switching circuit driving form determination means determines the on/off state of each switching circuit based on the relationship between the total thermal energy supplied to the predetermined site from all of the plurality of heating elements and energy loss derived from internal resistance of the switching circuit to be energized so that the proportion of the total thermal energy loss of all of the switching circuits relative to each temperature detected by the temperature detection means is minimized. This determination may be carried out each time when the temperature has been detected. Alternatively, for example, a table containing previously determined data may be provided. The on/off state of the plurality of switching circuits is controlled by the switching circuit driving control means according to the temperature detected by the temperature detection means based on the result of determination in the switching circuit driving form determination means. Thus, since the plurality of heating elements are not connected in parallel but are independently energized for each heating element group, the resistance value of the heating element is not apparently lowered. Therefore, energy loss derived from the internal resistance of the switching circuit can be suppressed. Further, since these heating elements can be independently driven for each heating element group, when the power consumption may be small, a method may be adopted wherein only a part of the heating elements is driven at a higher applied voltage than the case where all the heating elements are simultaneously driven. This also can suppress energy loss derived from the internal resistance of the switching circuit. Further, since the plurality of heating elements are divided into a plurality of heating element groups, a plurality of heating elements can exist in each heating element group. Therefore, even when the allowable current value per heating element is low, the connection of these elements in parallel enables the elements to withstand large current.

(23) The temperature control apparatus according to the above item (21) or (22), wherein the plurality of heating elements are in a flat plate form and have been stacked on top of each other or one another.

In the temperature control apparatus in the item (23), since the plurality of heating elements are in a flat plate form and have been stacked on top of each other or one another, the size of the whole apparatus can be reduced, and, at the same time, wasteful convey of the thermal energy can be avoided.

(24) The temperature control apparatus according to the above item (21) or (22), wherein the plurality of heating elements have been stacked on top of each other or one another and each comprise a flat plate of an insulator and a heating element pattern provided on the flat plate, the plurality of heating elements constituting a combination of a plurality of different heating element patterns.

In the temperature control apparatus in the item (24), the provision of a combination of a plurality of heating element patterns on the flat plates can realize highly even heat conduction.

(25) The temperature control apparatus according to the above item (21) or (22), wherein the plurality of heating elements are provided so as to surround the predetermined site.

In the temperature control apparatus of the invention, it is not always required to provide the plurality of heating elements so that, as defined in the above item (24), one side of the laminate of the plurality of heating elements faces the predetermined site. Specifically, as defined in the item (25), the plurality of heating elements may be provided so as to surround the predetermined site.

(26) The temperature control apparatus according to the above item (21) or (22), wherein the switching circuit driving form determination means comprises storage means which stores a table showing the on/off state of each switching circuit in relation to each temperature detected in the temperature detection means.

According to the temperature control apparatus in the item (26), in the switching circuit driving form determination means, a method may be adopted wherein a determination method is determined and data on this are previously tabulated. This can reduce a burden on a processor side such as CPU.

(27) The temperature control apparatus according to the above item (21) or (22), wherein the switching circuits each comprise a switching transistor having internal resistance.

In the temperature control apparatus in the item (27), the switching circuits each comprise a switching transistor having internal resistance. However, other devices may be of course used.

(28) The temperature control apparatus according to the above item (21) or (22), wherein, when the total thermal energy required per unit time is low, the switching circuit driving control means performs control in such a manner that the number of the plurality of switching circuits to be turned on is reduced as compared with that in the other cases.

When the total thermal energy required per unit time is low, turning on many switching circuits causes wasteful electric power. The temperature control apparatus in the item (28) can solve this problem by the adoption of a method wherein, when the total thermal energy required per unit time is low, the number of switching circuits to be turned on is made smaller than that in the other cases.

(29) The temperature control apparatus according to the above item (23), wherein the temperature detection means is provided outside the stacked heating elements.

According to the temperature control apparatus in the item (29), the temperature detection means may be provided outside the stacked heating elements.

(30) The temperature control apparatus according to the above item (23), wherein the temperature detection means has been embedded in the stacked heating elements.

According to the temperature control apparatus in the item (30), the temperature detection means may be embedded in the stacked heating elements.

(31) The temperature control apparatus according to the above item (23), wherein a flat heat conduction plate is provided between each two of the plurality of heating elements.

According to the temperature control apparatus in the item (31), the provision of a flat heat conduction plate between each two of the plurality of heating elements can convey heat in a facial direction of the plates to eliminate uneven heat dispersion.

(32) The temperature control apparatus according to the above item (30), wherein the temperature detection means is provided on the uppermost surface of the stacked heating elements.

According to the temperature control apparatus in the item (32), the provision of temperature detection means on the uppermost surface of the stacked heating elements enables the thermal energy feed-side temperature to be detected with the highest accuracy.

(33) A module comprising a heating element mounted structure, the heating element mounted structure comprising: a board; a heating element device fixed onto the board and capable of generating heat upon being energized; and an object to be heated which has been fixed onto the heating element device.

According to the module according to the item (33), since the heating element mounted structure comprises a board, a heating element device fixed onto the board and capable of generating heat upon being energized, and an object to be heated which has been fixed onto the heating element device, mounting of the object onto the printed board can realize heat control of the object.

(34) A module comprising a heating element mounted structure, the heating element mounted structure comprising: a board; a heating element device fixed onto the board and capable of generating heat upon being energized; a heat-conductive substrate fixed onto the heating element device; and an object to be heated which has been fixed onto the heat-conductive substrate.

According to the module according to the item (34), since the heating element mounted structure comprises a board, a heating element device fixed onto the board and capable of generating heat upon being energized, and an object to be heated which has been fixed onto the heating element device, mounting of the object onto the printed board can realize heat control of the object.

(35) A module comprising a heating element mounted structure, the heating element mounted structure comprising: a board; a heat-conductive substrate fixed onto the board through a support; a heating element device capable of generating heat upon being energized, the heating element device having been fixed onto the surface of the heat-conductive substrate in its board side; and an object to be heated which has been fixed onto the surface of the heat-conductive substrate remote from the heating element device.

The module in the item (35) includes a heating element mounted structure. The heating element mounted structure comprises a board, a heat-conductive substrate fixed onto the board through a support, and a heating element device capable of generating heat upon being energized. The heating element device has been fixed onto the surface of the heat-conductive substrate in its board side. The heating element mounted structure further includes an object to be heated which has been fixed onto the surface of the heat-conductive substrate remote from the heating element device. By virtue of this construction, mounting of the object onto the printed board can realize heat control of the object to be heated.

(36) A module comprising: (i) an object to be heated; (ii) a plurality of heating elements for supplying thermal energy to the object to be heated; (iii) a plurality of switching circuits which are provided in a one-to-one relationship with the plurality of heating elements and have respective intrinsic internal resistances; (iv) temperature detection means for detecting the temperature of the object to be heated; (v) switching circuit driving form determination means for determining the on/off state of each switching circuit based on the relationship between the total thermal energy supplied to the object to be heated from all of the plurality of heating elements and energy loss derived from internal resistance of the switching circuit to be energized so that the proportion of the total thermal energy loss of all of the switching circuits relative to each temperature detected by the temperature detection means is minimized; and (vi) switching circuit driving control means for controlling the on/off state of the plurality of switching circuits according to the temperature detected by the temperature detection means based on the result of determination in the switching circuit driving form determination means.

The module in the item (36) comprises an object to be heated and the temperature control apparatus according to the above item (21). This construction can realize efficient heat control and, at the same time, can reduce the whole size.

(37) A module comprising: (i) an object to be heated; (ii) a plurality of heating elements for supplying thermal energy to the object to be heated, the plurality of heating elements having been divided into a plurality of heating element groups; (iii) a plurality of switching circuits which are provided in a one-to-one relationship with the plurality of heating element groups and have respective intrinsic internal resistances; (iv) temperature detection means for detecting the temperature of the object to be heated; (v) switching circuit driving form determination means for determining the on/off state of each switching circuit based on the relationship between the total thermal energy supplied to the object to be heated from all of the plurality of heating elements and energy loss derived from internal resistance of the switching circuit to be energized so that the proportion of the total thermal energy loss of all of the switching circuits relative to each temperature detected by the temperature detection means is minimized; and (vi) switching circuit driving control means for controlling the on/off state of the plurality of switching circuits according to the temperature detected by the temperature detection means based on the result of determination in the switching circuit driving form determination means.

The module according to the item (37) comprises an object to be heated and the temperature control apparatus according to the above item (22). This construction can realize efficient heat control and, at the same time, can reduce the whole size.

(38) The module according to the above item (36) or (37), wherein the plurality of heating elements are in a flat plate form and have been stacked on top of each other or one another.

In the module in the item (38), since the plurality of heating elements are in a flat plate form and have been stacked on top of each other or one another, the size of the whole module can be reduced, and, at the same time, wasteful thermal energy conduction can be avoided.

(39) The module according to the above item (36) or (37), wherein the plurality of heating elements have been stacked on top of each other or one another and each comprise a flat plate of an insulator and a heating element pattern provided on the flat plate, the plurality of heating elements constituting a combination of a plurality of different heating element patterns.

In the module in the item (39), the provision of a combination of a plurality of heating element patterns on the flat plates can realize highly even heat conduction.

(40) The module according to the above item (36) or (37), wherein the plurality of heating elements are provided so as to surround the predetermined site.

In the module of the invention, it is not always required to provide the plurality of heating elements so that, as defined in the above item (39), one side of the laminate of the plurality of heating elements faces the predetermined site. Specifically, as defined in the item (40), the plurality of heating elements may be provided so as to surround the predetermined site.

(41) The module according to the above item (36) or (37), wherein the switching circuit driving form determination means comprises storage means which stores a table showing the on/off state of each switching circuit in relation to each temperature detected in the temperature detection means.

According to the module in the item (41), in the switching circuit driving form determination means, a method may be adopted wherein a determination method is determined and data on this are previously tabulated. This can reduce a burden on a processor side such as CPU.

(42) The module according to the above item (36) or (37), wherein the switching circuits each comprise a switching transistor having internal resistance.

In the module in the item (42), the switching circuits each comprise a switching transistor having internal resistance. However, other devices may be of course used.

(43) The module according to the above item (36) or (37), wherein, when the total thermal energy required per unit time is low, the switching circuit driving control means performs control in such a manner that the number of the plurality of switching circuits to be turned on is reduced as compared with that in the other cases.

When the total thermal energy required per unit time is low, turning on many switching circuits causes wasteful electric power. The module in the item (43) can solve this problem by the adoption of a method wherein, when the total thermal energy required per unit time is low, the number of switching circuits to be turned on is made smaller than that in the other cases.

(44) The module according to the above item (38), wherein the temperature detection means is provided outside the stacked heating elements.

According to the module in the item (44), the temperature detection means may be provided outside the stacked heating elements within the module.

(45) The module according to the above item (38), wherein the temperature detection means has been embedded in the stacked heating elements.

According to the module in the item (45), the temperature detection means may be embedded in the stacked heating elements.

(46) The module according to the above item (38), wherein a flat heat conduction plate is provided between each two of the plurality of heating elements.

According to the module in the item (46), the provision of a flat heat conduction plate between each two of the plurality of heating elements can convey heat in a facial direction of the plates to eliminate uneven heat dispersion.

(47) The module according to the above item (44), wherein the temperature detection means is provided on the uppermost surface of the stacked heating elements.

According to the module in the item (47), the provision of temperature detection means on the uppermost surface of the stacked heating elements enables the thermal energy feed-side temperature to be detected with the highest accuracy.

BRIEF DESCRIPTION OF THE DRAWINGS

The invention will be explained in more detail in conjunction with the appended drawings, wherein:

FIG. 8 is a circuit diagram showing the circuit construction of a principal part of the temperature control apparatus in the preferred embodiment shown in FIG. 6;

FIG. 9 is a circuit diagram showing the construction of a first switching circuit in the preferred embodiment shown in FIG. 6;

FIG. 11 is a conceptual diagram illustrating the storage contents of a heater control table storage unit in the preferred embodiment shown in FIG. 6;

DESCRIPTION OF THE PREFERRED EMBODIMENTS

Preferred embodiments of the invention will be explained in detail in conjunction with the accompanying drawings.

Figure 6:
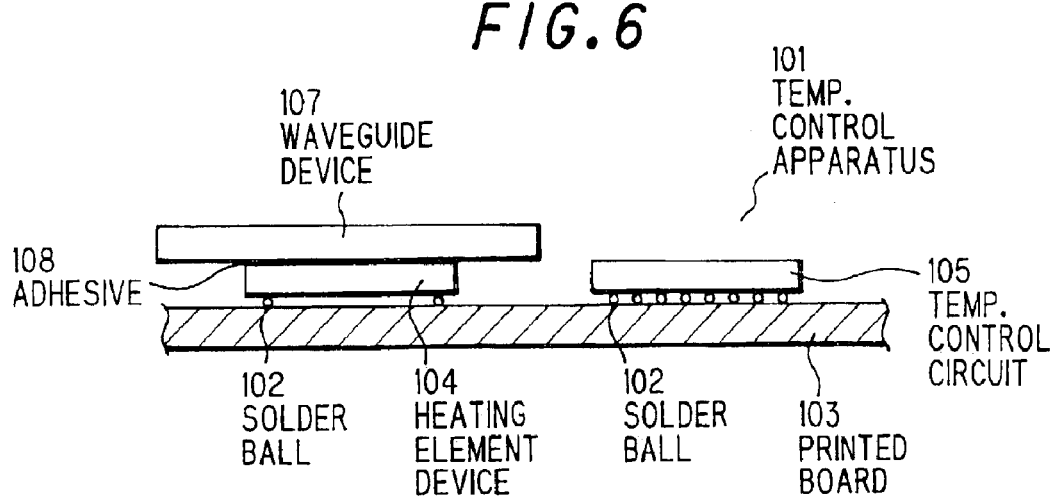
FIG. 6 is a schematic diagram showing the construction of a temperature control apparatus in a preferred embodiment of the invention.

FIG. 6 is a schematic diagram showing a temperature control apparatus using a heating element device in a preferred embodiment of the invention. A temperature control apparatus 101 includes a heating element device 104 and a temperature control circuit 105. The heating element device 104 has been surface mounted on a printed board 103 through solder balls 102. Likewise, the temperature control circuit 105 has been surface mounted on the printed board 103 through solder balls 102. A waveguide device 107, which is to be heat controlled, is bonded to the upper part of the heating element device 104 with an adhesive 108.

Figure 7:
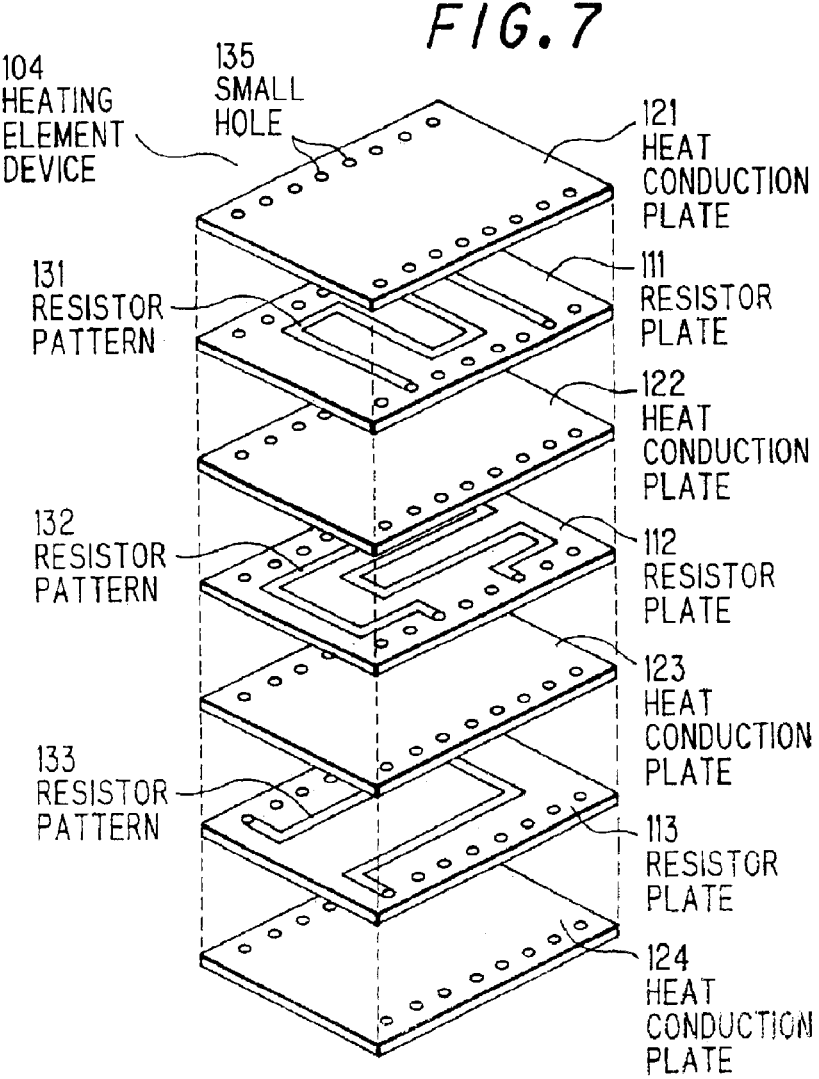
FIG. 7 is an exploded perspective view of a principal part of the construction of the heating element device in the preferred embodiment shown in FIG. 6.

FIG. 7 is an exploded view of a principal part of the heating element device in the preferred embodiment shown in FIG. 6. This heating element device 104 has been produced by firing stacked ceramic sheets. The ceramic sheets comprise first to third resistor plates 111 to 113 each formed of a resistor and first to fourth heat conduction plates 121 to 124. The first to fourth heat conduction plates 121 to 124 are disposed so as to sandwich each of the first to third resistor plates 111 to 113 between two of the first to fourth heat conduction plates 121 to 124. Specifically, the first resistor plate 111 is sandwiched between the first heat conduction plate 121 and the second heat conduction plate 122, the second resistor plate 112 is sandwiched between the second heat conduction plate 122 and the third heat conduction plate 123, and the third resistor plate 113 is sandwiched between the third heat conduction plate 123 and the fourth heat conduction plate 124. Alternatively, the first to third resistor plates 111 to 113 may be bonded to the first to fourth heat conduction plates 121 to 124 with an adhesive. A resistor pattern 131 is provided on one side (upper surface in the drawing) of the first resistor plate 111. Likewise, a resistor pattern 132 is provided on one side of the second resistor plate 112, and a resistor pattern 133 is provided on one side of the third resistor plate 113. The resistor patterns 131 to 133 are different from one another in pattern. The resistor patterns 131 to 133 are formed by silk printing or vapor deposition of tungsten on the surface of the plate. Materials other than tungsten usable for the formation of the resistor pattern include platinum, gold, and chromium. The first to third resistor plates 111 to 113 and the first to fourth heat conduction plates 121 to 124 are formed of a thin plate or sheet member which is insulative and highly heat conductive. Materials for the thin plate or sheet member may be ceramics such as aluminum nitride and alumina.

Small holes 135 are formed at predetermined spacings on both side portions of each of the first to third resistor plates 111 to 113 and the first to fourth heat conduction plates 121 to 124. Each end of the resistor patterns 131 to 133 provided on the first to third resistor plates 111 to 113 is disposed in contact with or near any one of the small holes 135.

The first to third resistor plates 111 to 113 and the first to fourth heat conduction plates 121 to 124 are stacked on top of one another in the order shown in the drawing while inserting pins (not shown) into the small holes 135. The leading end and the tail of the resistor patterns 131 to 133 are electrically connected either through a wire (not shown) or directly by soldering to pins inserted into the small holes 135 which correspond to the leading end and the tail in one-to-one relationship. These pins are electrically connected to corresponding solder balls 102 shown in FIG. 6, for example, through a bonding wire (not shown). According to this construction, upon the application of voltage to the corresponding solder balls 102 for energization, heat is generated from the first and second resistor patterns 131, 132 within the heating element device 104.

The third resistor pattern 133 may also be used for heat generation. In this preferred embodiment, however, the third resistor pattern 133 is used as a resistor for temperature detection. Since the resistance value of the resistor varies depending upon the temperature, the temperature of the heating element device 104 or the temperature of the waveguide device 107 shown in FIG. 6 can be measured by measuring the resistance value.

As shown in FIG. 7, the resistor pattern 131 provided on the first resistor plate 111 and the resistor pattern 132 provided on the second resistor plate 112 in this preferred embodiment are different from each other in pattern shape. The reason for the adoption of different pattern shapes is the dispersion of heat generation sites of the heating element device 104 on a plane with respect to the waveguide device 107. The first to fourth heat conduction plates 121 to 124 also function to disperse heat in a facial direction. The resistor patterns 131, 132 are not always required to be different from each other in pattern shape and may be identical to each other in pattern shape. Even in the case of an identical pattern shape, heat can be dispersed in a facial direction by varying the direction of incorporation of the resistor plates into the heating element device 104 to minimize the presence of patterns in identical plane sites in the stacked state. Further, the third resistor plate 113 for temperature detection is not always required to be located below the first and second resistor plates 111, 112, that is, on the printed board 103 side, in FIG. 7. Specifically, the third resistor plate 113 may be disposed above the first and second resistor plates 111, 112, that is, on the near-waveguide device 107 side, or may be disposed at a position between the first and second resistor plates 111, 112.

In this preferred embodiment, a heat conduction plate not provided with any resistor pattern is provided on both sides of each of the resistor plates. Specifically, the first heat conduction plate 121 and the second heat conduction plate 122 each not provided with any resistor pattern are provided respectively on upper and lower sides of the first resistor plate 111 provided with the resistor pattern 131, the second heat conduction plate 122 and the third heat conduction plate 123 each not provided with any resistor pattern are provided respectively on upper and lower sides of the second resistor plate 112 provided with the resistor pattern 132, and the third heat conduction plate 123 and the fourth heat conduction plate 124 each not provided with any resistor pattern are provided respectively on upper and lower sides of the third resistor plate 113 provided with the resistor pattern 133. In the construction of this preferred embodiment wherein the resistor patterns 131 to 133 are provided only on one side of the resistor plates 111 to 113, however, a part or the whole of the heat conduction plates 121 to 124 may not be provided. Further, a resistor pattern may be formed on both sides of the first to third resistor plates 111 to 113.

FIG. 8 shows the circuit construction of a principal part of the temperature control apparatus in this preferred embodiment. The first and second resistor patterns 131, 132 each having a resistance value of $R_H$ provided within the heating element device 104 in the temperature control apparatus 101 are connected respectively to corresponding switching circuits, i.e., a first switching circuit 141 and a second switching circuit 142, within the temperature control circuit 105. This enables independent driving and control. The third resistor pattern 133 having a resistance value of $R_D$ provided within the heating element device 104 is connected to a temperature detection circuit 143 within the temperature control circuit 105, and information 144 on resistance value thereof is supplied to a control unit 145.

The control unit 145 is configured to determine the temperature of the waveguide device 107 shown in FIG. 6 based on the resistance value information 144 and, based on the determined temperature of the waveguide device 107, to perform the control of voltage applied to the first and second switching circuits 141, 142 and the on-off control of the first and second resistor patterns 131, 132.

FIG. 9 shows the construction of the first switching circuit. Since the second switching circuit 142 has the same construction as the first switching circuit 141, the diagrammatic representation and explanation thereof will be omitted. The first switching circuit 141 is provided with a first switching transistor 151. The collector of the first switching transistor 151 is grounded, and the emitter of the first switching transistor 151 is connected to one end of the first resistor pattern 131 shown in FIG. 8. A variable power supply voltage $V_{CC}$ with a maximum voltage of 3.3 V is supplied from the control unit 145 shown in FIG. 8 to the first switching circuit 141 and is applied to the other end of the first resistor pattern 131. An on-off control signal $152_1$ is supplied from the control unit 145 to the base of the first switching transistor 151. The on-off control signal 152 is input through a line which is different from a line through which an on-off control signal is supplied to the second switching circuit 142 (not shown). Therefore, the first switching circuit 141 and the second switching circuit 142 can be controlled totally independently of each other. Further, the first switching circuit 141 is configured so that the power supply voltage $V_{CC1}$ is also controlled independently of the power supply voltage $V_{CC2}$ of the second switching circuit 142. For some apparatuses, however, these power supply voltages $V_{CC1}$, $V_{CC2}$ may be made common to the first and second switching circuits.

Figure 10:
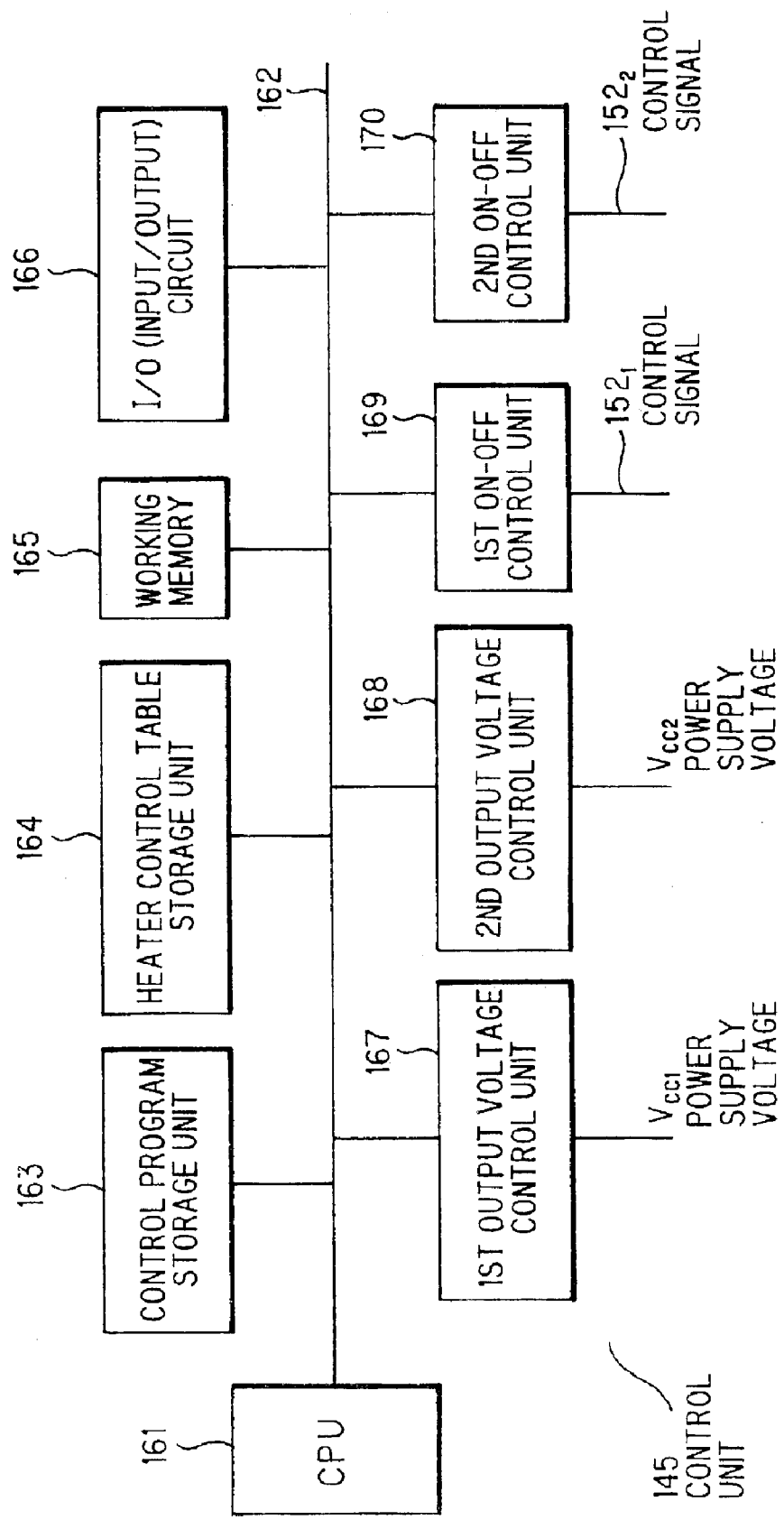
FIG. 10 is a block diagram showing the construction of a control unit in the preferred embodiment shown in FIG. 6.

FIG. 10 shows the construction of the control unit. The control unit 145 includes CPU (central processing unit) 161. CPU 161 is connected to various circuit devices through a bus 162 such as a data bus. Among these circuit devices, a control program storage unit 163 is a storage unit which stores a control program for various types of control for operating the control unit. The storage unit is formed of ROM (read only memory). A heater control table storage unit 164 is a storage unit which stores a heater control table as a table for controlling the first and second resistor patterns 131, 132 shown in FIG. 8. In this preferred embodiment, common ROM is used for the construction of the control program storage unit 163 and the heater control table storage unit 164. A working memory 165 is an area for storing temporary data necessary for CPU 161 to perform various types of control and is formed of RAM (random access memory).

An I/O (input-output) circuit 166 is a circuit for outputting control signals $152_1$, $152_2$ to be sent to the first and second switching circuits 141, 142 shown in FIG. 8 and for receiving the resistance value information 144 from the temperature detection circuit 143. A first output voltage control unit 167 is a circuit from which a power supply voltage $V_{CC1}$ is output according to the heater control table stored in the heater control table storage unit 164 and is sent to the first switching circuit 141. Likewise, a second output voltage control unit 168 is a circuit from which a power supply voltage $V_{CC2}$ is output according to the heater control table and is sent to the second switching circuit 142. A first on-off control unit 169 is a part from which a control signal $152_1$ for the on-off control of the first switching transistor 151 in the first switching circuit 141 is output according to the heater control table. Likewise, a second on-off control unit 170 is a part from which a control signal $152_2$ for the on-off control of a switching transistor (not shown) in the second switching circuit 142 is output according to the heater control table.

FIG. 11 is a conceptual diagram illustrating the contents of storage in a heater control table storage unit. Two tables, i.e., a first heater control table 171 for the control of the first switching circuit 141 shown in FIG. 8 and a second heater control table 172 for the control of the second switching circuit 142 shown in FIG. 8, are stored in the heater control table storage unit 164. Two power supply voltages $V_{CC1}$, $V_{CC2}$ are output using, as address information, temperature data representing the temperature difference of the waveguide device 107 shown in FIG. 6 based on the resistance value information 144 obtained from the temperature detection circuit 143 shown in FIG. 8.

FIG. 11 shows data described in the first and second heater control tables 171, 172 as output characteristics of power supply voltages $V_{CC1}$, $V_{CC2}$. A solid line 173 shows the power supply voltage $V_{CC1}$, and a solid line 174 the power supply voltage $V_{CC2}$. A broken line 175 shows control characteristics, assuming that any one of the first and second resistor patterns 131, 132 is energized. In this drawing, the solid line 174 exists only when the temperature (difference) is above $t_A$ that is, in a portion located on the right side of the temperature (difference) $t_A$ in the drawing. This shows that the second resistor pattern 132 is deenergized in a region where the temperature (difference) is $t_A$ or below. Specifically, the control unit 145 in this preferred embodiment shown in FIG. 8 does not always drive the first and second resistor patterns 131, 132 in an identical state, and, when the waveguide device 107 should be heated by relatively large electric power in a region where the temperature (difference) is above $t_A$, for example, in an initial state, both the first and second resistor patterns 131, 132 are energized, while, in a region where the temperature (difference) is $t_A$ or below, only the first resistor pattern 131 is energized.

Therefore, in the region where the temperature (difference) is below a point 177 in FIG. 11 where the solid line 173 intersects the broken line 175, heat is generated by energization from only the first resistor plate 111 in the first and second resistor plates 111, 112. Therefore, in this case, the power supply voltage $V_{CC1}$ applied is higher than that in the case where heat is generated from both the resistor plates 111, 112 (broken line 175). By virtue of this, in an ordinary state in which only the first resistor plate 111 is energized, as compared with the collector-to-emitter voltage of the first switching transistor 151, the voltage applied to the first resistor plate 111 is relatively larger. This can suppress wasteful power consumption of the first switching transistor 151.

Figure 1:
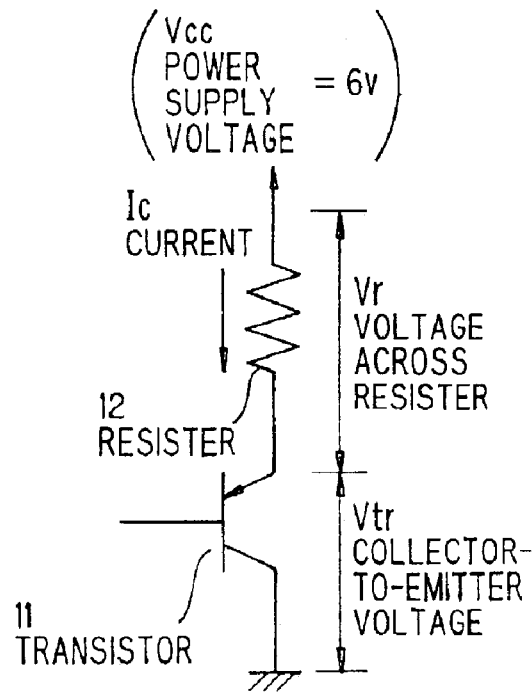
FIG. 1 is a circuit diagram showing a heater which is subjected to on-off control by a transistor with a power supply voltage of 5 V.
Figure 2:
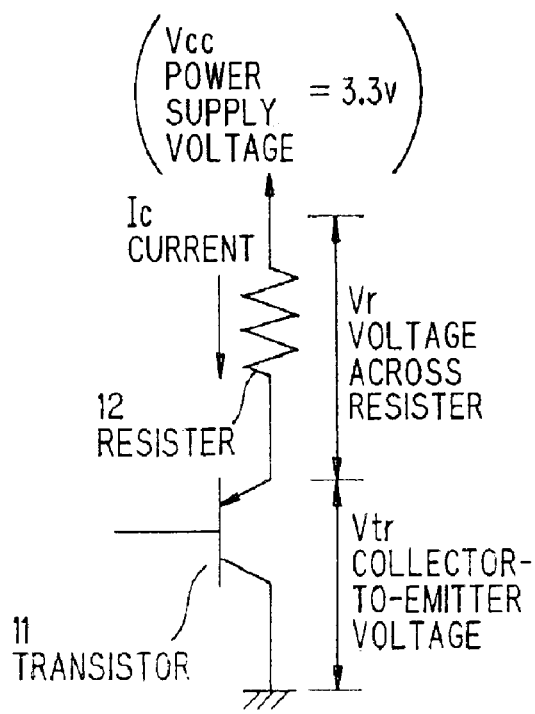
FIG. 2 is a circuit diagram showing a heater which is subjected to on-off control by a transistor with a power supply voltage of 3.3 V.
Figure 3:
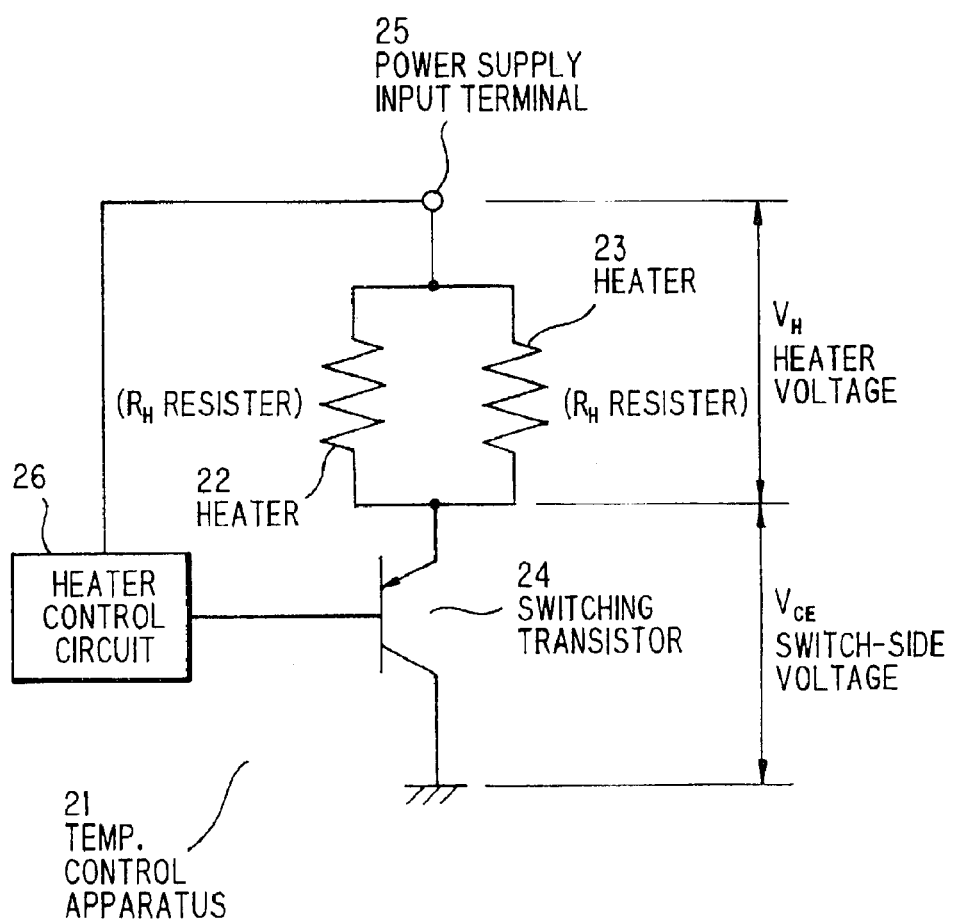
FIG. 3 is a circuit diagram showing the principal construction of a conventional temperature control apparatus.
Figure 4:
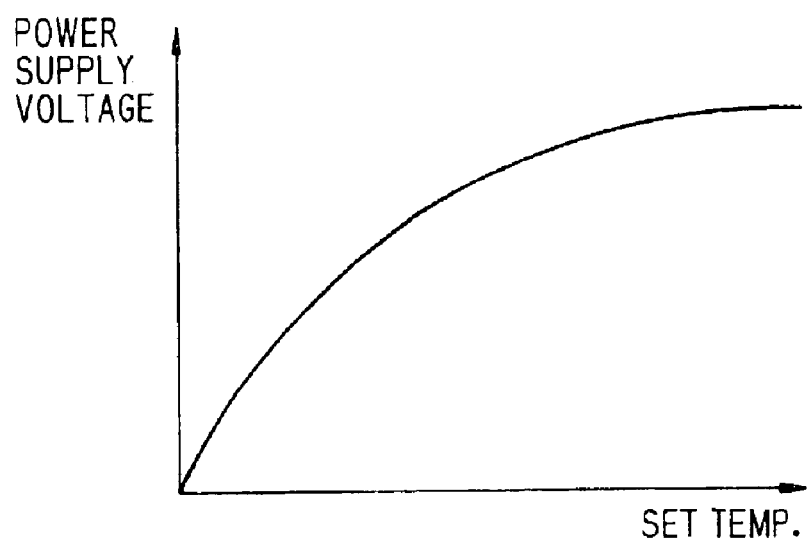
FIG. 4 is a characteristic diagram showing the relationship between the temperature and the power supply voltage in the temperature control apparatus shown in FIG. 3.
Figure 5:
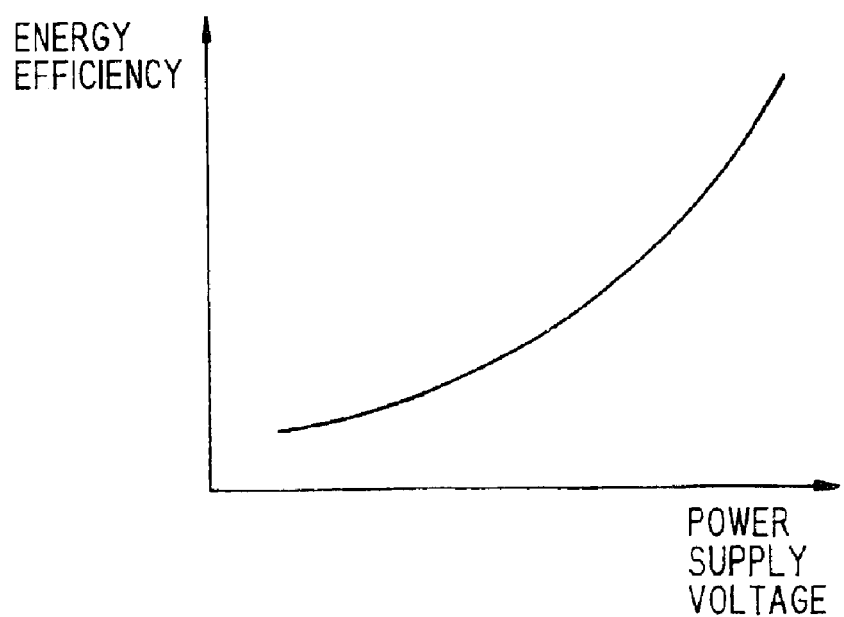
FIG. 5 is a characteristic diagram showing the relationship between the power supply voltage and the energy efficiency in the temperature control apparatus shown in FIG. 3.

Further, in the conventional temperature control apparatus, as shown in FIG. 3, the heaters (resistor plates) 22, 23 are connected in parallel. Due to this parallel connection, the combined resistance value is lowered, resulting in lowered power supply voltage applied to the parallel circuit. This in turn increases the power consumption of the switching transistor 24. On the other hand, in the temperature control apparatus 101 in this preferred embodiment, the switching transistors 151 are not connected in parallel, and power supply voltages $V_{CC1}$, $V_{CC2}$ are applied across both ends of respective switching transistors independently of each other. This also can suppress wasteful power consumption of the switching transistor.

Figure 12:
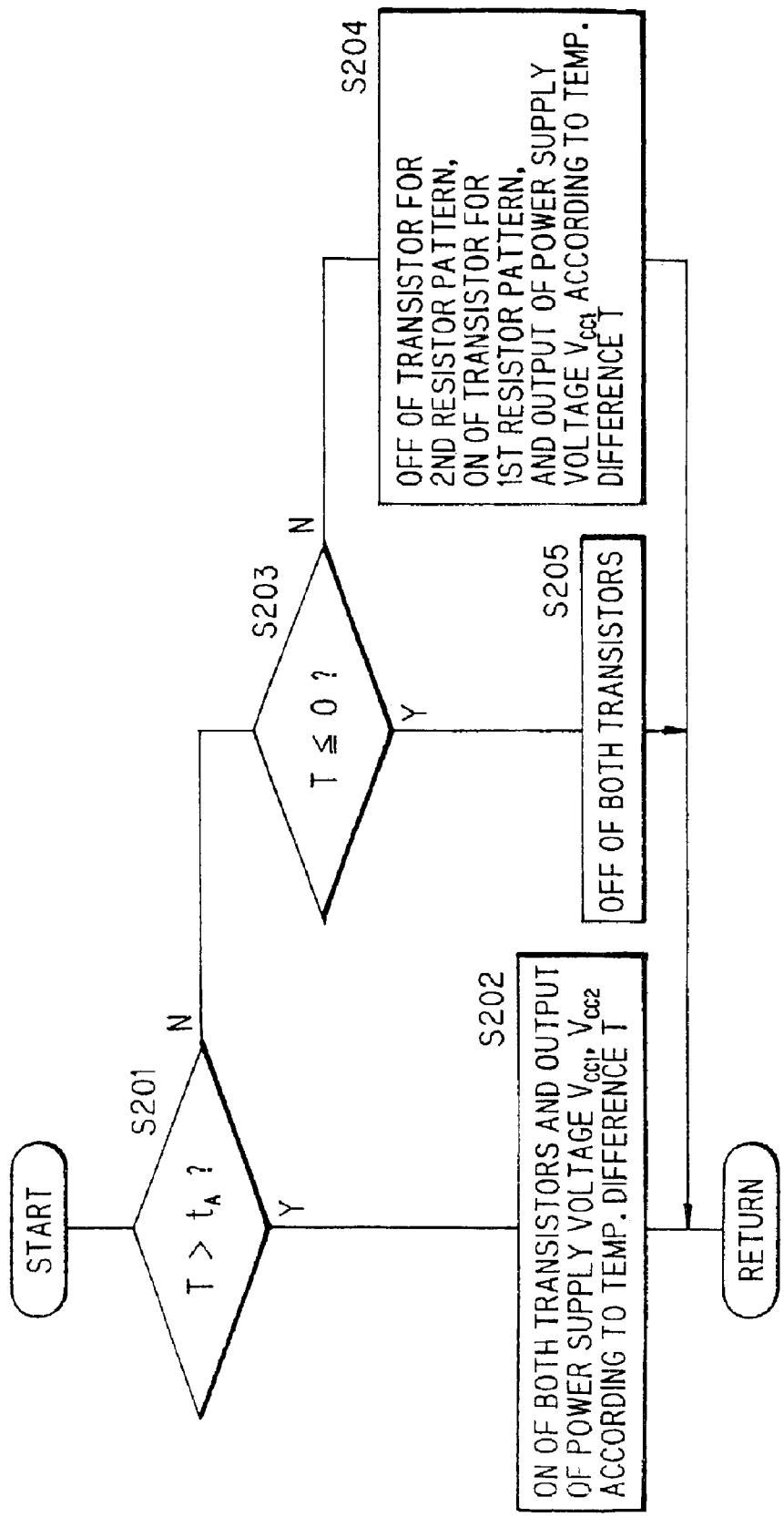
FIG. 12 is a flow diagram illustrating the control in a control unit in the preferred embodiment shown in FIG. 6.

FIG. 12 illustrates the control of the control unit. CPU 161 shown in FIG. 10 grasps a difference T between the target temperature and the current temperature of the waveguide device 107 shown in FIG. 6. When the temperature difference T exceeds the value $t_A$ (step S201: Y), each of the switching transistors 151 is turned on. Power supply voltages $V_{CC1}$, $V_{CC2}$ according to the temperature difference T are read from the first and second heater control tables 171, 172, respectively. These voltages are generated in the first output voltage control unit 167 or the second output voltage control unit 168 and are applied to the corresponding first and second resistor patterns 131, 132 (step S202).

On the other hand, when the temperature difference T is the value $t_A$ or smaller but is not 0 (zero) or less than 0, that is, when a relatively small degree of heating is necessary (step S203: N), CPU 161 controls the base of the second switching circuit 142 to turn off the switching transistor. In this state, the first switching transistor 151 in the first switching circuit 141 is turned on, power supply voltage $V_{CC1}$ corresponding to the current temperature difference T is read from the first heater control table 171, and this voltage is generated in the first output voltage control unit 167 arid is applied to the first resistor pattern 131 (step S204).

When the relationship between the target temperature and the detected temperature is such that, as a result of sufficient heating of the waveguide device 107, the target temperature is the same as the detected temperature, or the detected temperature is above the target temperature (step S203: Y), heating is not necessary. Therefore, in this case, both the switching transistors 151 are turned off (step S205).

In the preferred embodiment, two heaters of the first and second resistor patterns 131, 132 are provided within the heating element device 104. The number of heaters, however, is not limited to two, and three or more heaters may be provided. Further, in the preferred embodiment, the third resistor pattern 133 provided within the heating element device 104 is utilized as an element for temperature detection. This third resistor pattern 133 may also be used as the heater. In this case, a temperature detection element may be externally provided at a predetermined position of the heating element device 104, or alternatively may be provided at or near a position where heat energy is supplied, such as the waveguide device 107. In the preferred embodiment, the first and second resistor patterns 131, 132 have an identical resistance value $R_H$. The first and second resistor patterns 131, 132, however, may be different from each other in resistance value.

In the preferred embodiment, a plurality of resistor patterns are each independently controlled for heat generation. Alternatively, when a relatively large number of heaters such as resistor patterns are provided, a method may be adopted wherein the plurality of heaters are divided into a plurality of groups and energization is controlled for each group.

In the construction of the preferred embodiment, a device to be heated, such as the waveguide device 107, is provided separately from a heating device such as the heating element device 104. If necessary, they may be combined to form a module, for example, a module with temperature control function. In this case, a control circuit such as the temperature control circuit 105 shown in FIG. 6 may be incorporated into the module or alternatively may be provided as a separate circuit.

In the preferred embodiment, the heating element device 104 is bonded to the printed board 103 through the solder balls 102. The connection form, however, is not limited to this only.

Figure 13:
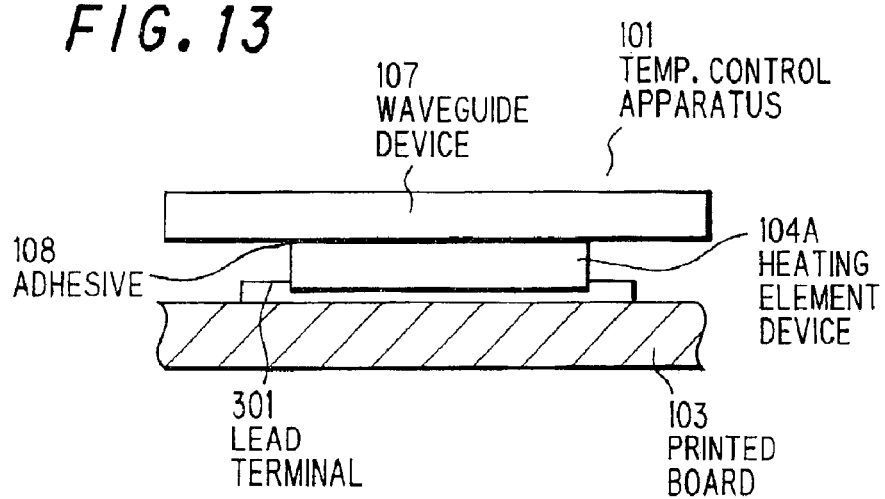
FIG. 13 is a schematic block diagram showing a first variant of the form of connection between the heating element device and the printed board.

FIG. 13 shows a first variant of the form of connection between the heating element device and the printed board. In FIGS. 6 and 13, like parts are identified with the same reference characters, and unnecessary overlapped explanation thereof will be omitted. In this first variant, a heating element device 104A, to which a waveguide device 107 has been bonded with an adhesive 108, is mounted on a printed board 103 through a lead terminal 301 which has been horizontally protruded from near the bottom of the heating element device 104A and has been folded in a Z form. The lead terminal 301 can reduce the escape of heat generated from the heating element device 104A toward the printed board 103 and thus can improve the energy efficiency.

Figure 14:
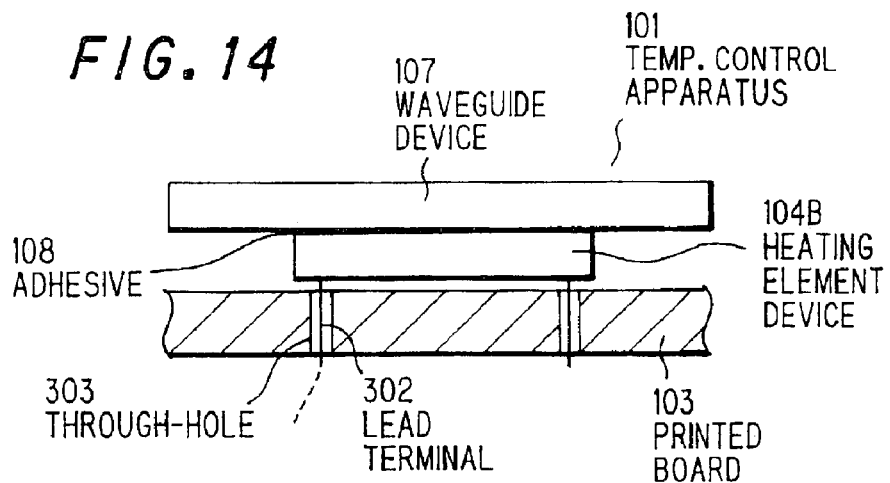
FIG. 14 is a schematic block diagram showing a second variant of the form of connection between the heating element device and the printed board.

FIG. 14 shows a second variant of the form of connection between the heating element device and the printed board. In FIGS. 6 and 14, like parts are identified with the same reference characters, and unnecessary overlapped explanation thereof will be omitted. In this second variant, a heating element device 104B, to which a waveguide device 107 has been bonded with an adhesive 108, is fixed to a printed board 103 by inserting lead terminals 302 protruded perpendicularly from the bottom of the heating element device 104B into through-holes 303 in the printed board 103 to fix the lead terminals 302 to the printed board 103. In this case, the bottom of the heating element device 104B is located above and separately from the surface of the printed board 103 through the lead terminals 302. By virtue of this, heat generated from the heating element device 104A is less likely to be escaped toward the printed board 103, and the energy efficiency can be improved.

Figure 15:
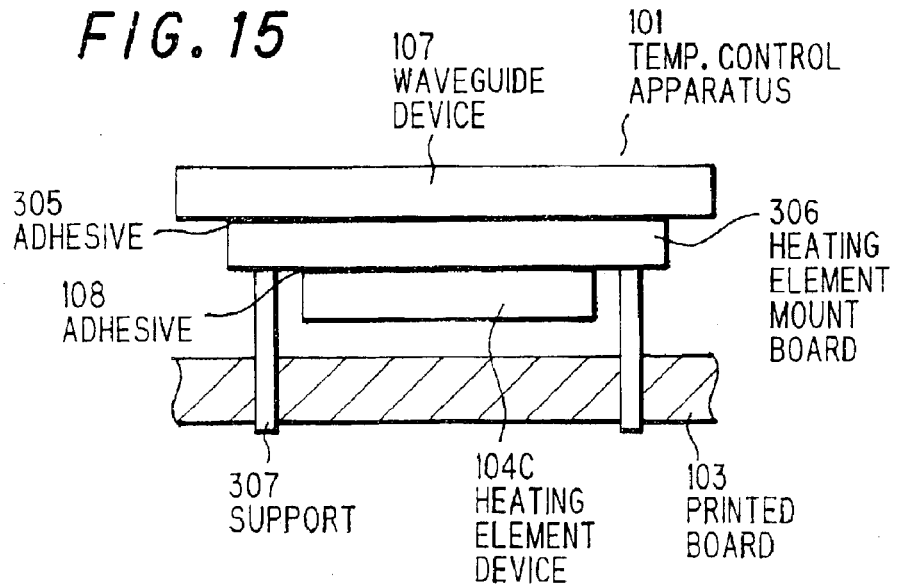
FIG. 15 is a schematic block diagram showing a third variant of the form of connection between the heating element device and the printed board.

FIG. 15 shows a third variant of the form of connection between the heating element device and the printed board. In FIGS. 6 and 15, like parts are identified with the same reference characters, and unnecessary overlapped explanation thereof will be omitted. In this third variant, a waveguide device 107 is bonded to the upper surface of a heating element mount board 306 with an adhesive 305. Supports 307 implanted in the heating element mount board 306 are fitted in a printed board 103. A heating element 104C is bonded to the lower surface of the heating element mount board 306 with an adhesive 108. The length of the supports 307 between the lower surface of the heating element mount board 306 and the upper surface of the printed board 103 is regulated so that the bottom of the heating element 104C is in noncontact with the upper surface of the printed board 103. Therefore, also in this variant, heat generated from the heating element device 104C is less likely to be escaped toward the printed board 103, and the energy efficiency can be improved.

In the preferred embodiment, an apparatus for regulating the temperature of the waveguide device 107 has been explained. The invention, however, can be of course applied to all temperature control apparatuses which cause any loss in switching means per se and all modules, in which heat control is performed, other than those formed by combining the waveguide device 107.

As described above, in the heating element device according to the above item (1), a plurality of heating element plates each comprising an insulator and a resistor provided on the insulator have been stacked on top of each other or one another and are configured so as to be each independently controllable with respect to energization for heat generation by the supply of electric power. Therefore, the resistors can be each independently controllable with respect to energization, and even a low-voltage power supply can be efficiently utilized. The heating element device according to the above item (2) can attain the same effect as in the heating element device as defined in the item (1). Further, the stacking of the resistors for heat generation, together with the temperature detection plate, can realize a design in which the whole system is compact.

In the heating element device in the above item (3), the plurality of heating element plates are different from each other or one another in a resistor pattern provided on the surface thereof. By virtue of this construction, generated heat can be dispersed on the facial direction of the heating element plates. Therefore, the member for heat conduction for dispersing heat in a facial direction can be omitted or simplified.

In the heating element mounted structure in the above item (8), the heating element device according to the above item (1) or (2) is fixed onto a board such as a printed board and, in addition, an object to be heated is fixed onto the heating element device. According to this construction, an object to be heated can be simply mounted onto the printed board.

In the heating element mounted structure in the item (9), the heating element device according to the above item (1) or (2) is fixed onto a board such as a printed board and, in addition, an object to be heated is fixed onto the heating element device through a heat-conductive substrate. According to this construction, an object to be heated can be simply mounted onto the printed board, and, at the same time, the use of the heat-conductive substrate can improve the dispersion of heat in the facial direction.

In the heating element mounted structure in the item (10), a heat-conductive substrate is fixed onto a board such as a printed board through a support, and the heating element device according to the above item (1) or (2) and an object to be heated are fixed onto the heat-conductive substrate so as to sandwich the heat-conductive substrate between the heating element device and the object. According to this construction, heat generated from the heating element device can be evenly conveyed to the object to be heated. Further, the length of the support so as for the heating element device can be regulated so as to be located above and separated from the printed board, and this can reduce the proportion of heat conveyed to the printed board side and can improve the thermal efficiency.

In the temperature control circuit according to the item (11) or in the temperature control apparatus according to the item (17), temperature data for measuring the temperature of an object to be heated is input into the temperature control circuit to change the number of resistors to be energized in the plurality of resistors depending upon the temperature indicated by the temperature data, followed by energization control of these resistors. According to this construction, even when the drive voltage is low, the power supply can be efficiently utilized by reducing the number of resistors.

In the temperature control circuit according to the item (12) or in the temperature control apparatus according to the item (18), switching means is provided between each of the plurality of first resistors and the energization means for energizing the resistors, and the number of resistors to be energized in the plurality of first resistors is properly varied according to temperature data received from the detection temperature input means. According to this construction, the power supply can be efficiently utilized even when the drive voltage is low.

According to the temperature control circuit as defined in the above item (13), in the temperature control circuit in the above item (11), the switching means reduces the number of resistors to be supplied with electric power in the plurality of resistors as the temperature of the object to be heated approaches a set temperature as a target value. Therefore, even when the switching means has intrinsic resistance, the electric power can be efficiently controlled according to the necessary quantity of heat.

According to the temperature control circuit as defined in the above item (14), in the temperature control circuit in the above item (12), the switching means reduces the number of resistors to be supplied with electric power in the plurality of first resistors as the temperature of the object to be heated approaches a set temperature as a target value. Therefore, even when the switching means has intrinsic resistance, the electric power can be efficiently controlled according to the necessary quantity of heat.

According to the temperature control circuit as defined in the above item (15), in the temperature control circuit in the above item (11), the switching means reduces the number of resistors to be supplied with electric power in the plurality of resistors only when a difference between the temperature of the object to be heated and the set temperature as the target value has become smaller than a predetermined value. Until this stage, the control of temperature is carried out using the plurality of resistors. Therefore, a satisfactory quantity of heat can be obtained, and heat response is quick.

According to the temperature control circuit as defined in the above item (16), in the temperature control circuit in the above item (12), the switching means reduces the number of resistors to be supplied with electric power in the plurality of first resistors only when a difference between the temperature of the object to be heated and the set temperature as the target value has become smaller than a predetermined value. Until this stage, the control of temperature is carried out using the plurality of first resistors. Therefore, when the temperature difference is large, a satisfactory quantity of heat can be obtained, and heat response is quick.

According to the temperature control apparatus as defined in the above item (19), in the temperature control apparatus in the above item (17), the switching means reduces the number of resistors to be supplied with electric power in the plurality of resistors as the temperature of the object to be heated approaches a set temperature as a target value. Therefore, even when the switching means has intrinsic resistance, the electric power can be efficiently controlled according to the necessary quantity of heat.

According to the temperature control apparatus as defined in the item (20), in the temperature control apparatus in the above item (18), the switching means reduces the number of resistors to be supplied with electric power in the plurality of first resistors only when a difference between the temperature of the object to be heated and the set temperature as the target value has become smaller than a predetermined value. Until this stage, the control of temperature is carried out using the plurality of first resistors. Therefore, a satisfactory quantity of heat can be obtained, and heat response is quick.

According to the temperature control apparatus as defined in the above item (21) or the module as defined in the above item (36), rather than simultaneous energization of the plurality of heating elements, the plurality of heating elements are each independently energized. Therefore, the resistance value of the heating element is not apparently lowered, and energy loss derived from the internal resistance of the switching circuit can be suppressed. Further, since these heating elements can be each independently driven, when the power consumption may be small, a method may be adopted wherein only a part of the heating elements is energized. This construction can improve energy efficiency over the case where all the heating elements are simultaneously driven. By virtue of this, cost-effective operation can be realized even in a system, such as communication systems, wherein heat control of many objects is required.

According to the temperature control apparatus as defined in the above item (22) or the module as defined in the above item (37), rather than parallel connection of all of the plurality of heating elements, the plurality of the heating elements are divided into a plurality of heating element groups which can be each independently driven. Therefore, as compared with the case where all the plurality of the heating elements are connected in parallel, the resistance value of the heating element is not apparently lowered, and energy loss derived from the internal resistance of the switching circuit can be suppressed. Further, since these heating elements can be driven for each heating element group, when the power consumption may be small, a method may be adopted wherein only a part of the heating elements is driven at a higher applied voltage than the case where all the heating elements are simultaneously driven. This also can suppress energy loss derived from the internal resistance of the switching circuit. By virtue of this, cost-effective operation can be realized in a system, such as communication systems, wherein heat control of many objects such as semiconductors and optical circuits is required. Further, since the plurality of heating elements are divided into a plurality of heating element groups, a plurality of heating elements can exist in each heating element group, even when the allowable current value per heating element is low, the connection of these elements in parallel enables the elements to withstand large current.

According to the temperature control apparatus as defined in the above item (23) or the module as defined in the above item (38), since the plurality of heating elements are in a flat plate form and have been stacked on top of each other or one another, the whole size can be reduced, and, at the same time, wasteful convey of the thermal energy can be avoided.

According to the temperature control apparatus as defined in the above item (24) or the module as defined in the above item (39), the provision of a combination of a plurality of heating element patterns on the flat plates can realize highly even heat conduction.

According to the temperature control apparatus as defined in the above item (26) or the module as defined in the above item (41), in the switching circuit driving form determination means, a method is adopted wherein a determination method is previously determined and data on this are tabulated. This can reduce a burden on a processor side such as CPU.

In the temperature control apparatus as defined in the above item (28) or the module as defined in the above item (43), when the total thermal energy required per unit time is low, the switching circuit driving control means performs control in such a manner that the number of the plurality of switching circuits to be turned on is reduced as compared with that in the other cases. Therefore, wasteful power consumption can be reduced.

In the temperature control apparatus as defined in the above item (31) or the module as defined in the above item (46), the provision of a flat heat conduction plate between each two of the plurality of heating elements can convey heat in a facial direction of the plates to eliminate uneven heat dispersion.

The invention has been described in detail with particular reference to preferred embodiments, but it will be understood that variations and modifications can be effected within the scope of the invention as set forth in the appended claims.

What is claimed is:

1. A heating element device comprising a laminate of a plurality of heating element plates, each of the heating element plates comprising an insulator and a resistor, capable of generating heat upon the supply of electric power, provided on the insulator, said plurality of heating element plates being each independently controllable with respect to energization; wherein said resistor is provided on both sides of the insulator in said plurality of heating element plates.

2. A heating element device comprising a laminate of a plurality of heating element plates, each of the heating element plates comprising an insulator and a resistor, capable of generating heat upon the supply of electric power, provided on the insulator, wherein, in said plurality of heating element plates, the resistor is provided on both sides of the insulator said plurality of heating element plates being each independently controllable with respect to energization, and a temperature detection plate comprising an insulator and a resistor, capable of undergoing a change in resistance value upon a change in temperature, provided on the insulator.

3. The heating element device according to claim 1 or 2, wherein said plurality of heating element plates are different from each other or one another in a resistor pattern provided on the surface thereof.

4. The heating element device according to claim 1, wherein an insulator plate formed of an insulator is provided between each two of the plurality of heating element plates.

5. The heating element device according to claim 2, wherein an insulator plate formed of an insulator is provided between each two of the plurality of heating element plates.

6. A heating element mounted structure comprising:

a board;

the heating element device according to claim 1 or 2 which has been fixed onto the board and can generate heat upon being energized; and an object fixed onto the heating element device and to be heated.

7. A heating element mounted structure comprising:

a board;

the heating element device according to claim 1 or 2 which has been fixed onto the board and can generate heat upon being energized;

a heat-conductive substrate fixed onto the heating element device; and an object fixed onto the heat-conductive substrate and to be heated.

8. A heating element mounted structure comprising:

a board;

a heat-conductive substrate fixed onto the board through a support;

the heating element device according to claim 1 or 2 which has been fixed onto the surface of the heat-conductive substrate in its board side and can generate heat upon being energized; and an object to be heated which has been fixed onto the surface of the heat-conductive substrate remote from the heating element device.

9. A temperature control circuit comprising:

temperature data input means for inputting temperature data for measuring the temperature of an object to be heated;

energization means for energizing a plurality of resistors capable of generating heat upon being energized independently of each other or one another, wherein said resistors are provided on both sides of an insulator; and switching means for changing the number of resistors to be energized in the plurality of resistors depending upon the temperature indicated by the temperature data fed by the temperature data input means and for controlling said resistors with respect to energization.

10. A temperature control circuit comprising:

temperature detection means for permitting the input of resistance values of a second resistor which, together with a plurality of first resistors capable of generating heat upon being energized, constitutes a laminate and for detecting, based on a change in the resistance value, the temperature of an object to be heated, said object having been fixed onto the laminate of the first and second resistors;

energization means for energizing said plurality of first resistors independently of each other or one another; and switching means for changing the number of resistors to be energized in the plurality of first resistors depending upon the temperature detected by the temperature detection means and for controlling said first resistors with respect to energization.

11. The temperature control circuit according to claim 9, wherein said switching means reduces the number of resistors to be supplied with electric power in said plurality of resistors as the temperature of the object to be heated approaches a set temperature as a target value.

12. The temperature control circuit according to claim 10, wherein said switching means reduces the number of resistors to be supplied with electric power in said plurality of first resistors as the temperature of the object to be heated approaches a set temperature as a target value.

13. The temperature control circuit according to claim 9, wherein said switching means reduces the number of resistors to be supplied with electric power in said plurality of resistors when a difference between the temperature of the object to be heated and the set temperature as the target value is smaller than a predetermined value.

14. The temperature control circuit according to claim 10, wherein said switching means reduces the number of resistors to be supplied with electric power in said plurality of first resistors when a difference between the temperature of the object to be heated and the set temperature as the target value is smaller than a predetermined value.

15. A temperature control apparatus comprising:

a heating element device formed of a laminate of a plurality of resistors capable of generating heat upon being energized, wherein said resistors are provided on both sides of an insulator;

an object to be heated, said object having been mounted directly or indirectly onto the heating element device;

detection temperature input means for inputting the temperature of the object to be heated;

energization means for energizing said plurality of resistors constituting the heating element device independently of each other or one another; and switching means for changing the number of resistors to be energized in the plurality of resistors depending upon the temperature input by the detection temperature input means and for controlling said resistors with respect to energization.

16. A temperature control apparatus comprising:

a heating element device formed of a laminate of a plurality of first resistors capable of generating heat upon being energized and a second resistor for detecting a change in resistance value caused by a change in temperature, wherein said first resistors are provided on both sides of an insulator;

an object to be heated, said object having been mounted directly or indirectly onto the heating element device;

detection temperature input means for inputting the temperature of the object to be heated;

energization means for energizing said plurality of first resistors constituting the heating element device independently of each other or one another;

detection temperature input means for inputting the resistance value of the second resistor; and switching means for changing the number of resistors to be energized in the plurality of first resistors depending upon the temperature input by the detection temperature input means and for controlling said resistors with respect to energization.

17. The temperature control apparatus according to claim 15, wherein said switching means reduces the number of resistors to be supplied with electric power in said plurality of resistors as the temperature of the object to be heated approaches a set temperature as a target value.

18. The temperature control apparatus according to claim 16, wherein said switching means reduces the number of resistors to be supplied with electric power in said plurality of first resistors when a difference between the temperature of the object to be heated and the set temperature as the target value is smaller than a predetermined value.

19. A temperature control apparatus comprising:

a plurality of heating elements for supplying thermal energy to a predetermined site;

a plurality of switching circuits having respective intrinsic internal resistances which are provided in a one-to-one relationship with said plurality of heating elements;

temperature detection means for detecting the temperature of the predetermined site;

switching circuit driving form determination means for determining the on/off state of each switching circuit based on the relationship between the total thermal energy supplied to the predetermined site from all of said plurality of heating elements and energy loss derived from internal resistance of the switching circuit to be energized so that the proportion of the total thermal energy loss of all of the switching circuits relative to each temperature detected by said temperature detection means is minimized; and switching circuit driving control means for controlling the on/off state of said plurality of switching circuits according to the temperature detected by said temperature detection means based on the result of determination in said switching circuit driving form determination means.

20. A temperature control apparatus comprising:
a plurality of heating elements for supplying thermal energy to a predetermined site, said plurality of heating elements having been divided into a plurality of heating element groups;
a plurality of switching circuits having respective intrinsic internal resistances which are provided in a one-to-one relationship with said plurality of heating element groups;
temperature detection means for detecting the temperature of the predetermined site;
switching circuit driving form determination means for determining the on/off state of each switching circuit based on the relationship between the total thermal energy supplied to the predetermined site from all of said plurality of heating elements and energy loss derived from internal resistance of the switching circuit to be energized so that the proportion of the total thermal energy loss of all of the switching circuits relative to each temperature detected by said temperature detection means is minimized; and
switching circuit driving control means for controlling the on/off state of said plurality of switching circuits according to the temperature detected by said temperature detection means based on the result of determination in said switching circuit driving form determination means.

21. The temperature control apparatus according to claim 19 or 20, wherein said plurality of heating elements are in a flat plate form and have been stacked on top of each other or one another.

22. The temperature control apparatus according to claim 19 or 20, wherein said plurality of heating elements have been stacked on top of each other or one another and each comprise a flat plate of an insulator and a heating element pattern provided on said flat plate, said plurality of heating elements constituting a combination of a plurality of different heating element patterns.

23. The temperature control apparatus according to claim 19 or 20, wherein said plurality of heating elements are provided so as to surround said predetermined site.

24. The temperature control apparatus according to claim 19 or 20, wherein said switching circuit driving form determination means comprises storage means which stores a table showing the on/off state of each switching circuit in relation to each temperature detected in said temperature detection means.

25. The temperature control apparatus according to claim 19 or 20, wherein said switching circuits each comprise a switching transistor having internal resistance.

26. The temperature control apparatus according to claim 19 or 20, wherein, when the total thermal energy required per unit time is low, said switching circuit driving control means performs control in such a manner that the number of said plurality of switching circuits to be turned on is reduced as compared with that in the other cases.

27. The temperature control apparatus according to claim 21, wherein said temperature detection means is provided outside said stacked heating elements.

28. The temperature control apparatus according to claim 21, wherein said temperature detection means has been embedded in said stacked heating elements.

29. The temperature control apparatus according to claim 21, wherein a flat heat conduction plate is provided between each two of said plurality of heating elements.

30. The temperature control apparatus according to claim 28, wherein said temperature detection means is provided on the uppermost surface of said stacked heating elements.

31. A module comprising a heating element mounted structure,
said heating element mounted strictured comprising: a board; a heating element device fixed onto said board and capable of generating beat upon being energized; and an object to be heated which has been fixed onto said heating element device, wherein individual elements of said heating element are provided on both sides of said board.

32. A module comprising a heating element mounted structure,
said heating element mounted structure comprising: a board; a heating element device fixed onto said board and capable of generating heat upon being energized, wherein individual elements of said heating element device are provided on both sides of said board; a heat-conductive substrate fixed onto said heating element device; and an object to be heated which has been fixed onto said heat-conductive substrate.

33. A module comprising a heating element mounted structure,
said heating element mounted structure comprising: a board; a heat-conductive substrate fixed onto said board through a support; a heating element device capable of generating heat upon being energized, said heating element device having been fixed onto the surface of said heat-conductive substrate in its board side; and an object to be heated which has been fixed onto the surface of said heat-conductive substrate remote from the heating element device.

34. A module comprising:
an object to be heated;
a plurality of heating elements for supplying thermal energy to said object to be heated;
a plurality of switching circuits which arc provided in a one-to-one relationship with said plurality of heating elements and have respective intrinsic internal resistances;
temperature detection means for detecting the temperature of the object to be heated;
switching circuit driving form determination means for determining the on/off state of each switching circuit based on the relationship between the total thermal energy supplied to the object to be heated from all of said plurality of heating elements and energy loss derived from internal resistance of the switching circuit to be energized so that the proportion of the total thermal energy loss of all of the switching circuits relative to each temperature detected by said temperature detection means is minimized; and
switching circuit driving control means for controlling the on/off state of said plurality of switching circuits according to the temperature detected by said temperature detection means based on the result of determination in said switching circuit driving form determination means.

35. A module comprising:
an object to be heated;
a plurality of healing elements for supplying thermal energy to said object to be heated, said plurality of heating elements having been divided into a plurality of heating element groups;

a plurality of switching circuits which are provided in a one-to-one relationship with said plurality of heating element groups and have respective intrinsic internal resistances;

temperature detection means for detecting the temperature of the object to be heated;

switching circuit driving form determination means for determining the on/off state of each switching circuit based on the relationship between the total thermal energy supplied to the object to be heated from all of said plurality of heating elements and energy loss derived from internal resistance of the switching circuit to be energized so that the proportion of the total thermal energy loss of all of the switching circuits relative to each temperature detected by said temperature detection means is minimized; and switching circuit driving control means for controlling the on/on state of said plurality of switching circuits according to the temperature detected by said temperature detection means based on the result of determination in said switching circuit driving form determination means.

36. The module according to claim 34 or 35, wherein said plurality of heating elements are in a flat plate form and have been stacked on top of each other or one another.

37. The module according to claim 34 or 35, wherein said plurality of heating elements have been stacked on top of each other or one another and each comprise a flat plate of an insulator and a heating element pattern provided on said flat plate, said plurality of heating elements constituting a combination of a plurality of different heating element patterns.

38. The module according to claim 34 or 35, wherein said plurality of heating elements are provided so as to surround said predetermined site.

39. The module according to claim 34 or 35, wherein said switching circuit driving form determination means comprises storage means which stores a table showing the on/off state of each switching circuit in relation to each temperature detected in said temperature detection means.

40. The module according to claim 34 or 35, wherein said switching circuits each comprise a switching transistor having internal resistance.

41. The module according to claim 34 or 35, wherein, when the total thermal energy required per unit time is low, said switching circuit driving control means performs control in such a manner that the number of said plurality of switching circuits to be turned on is reduced as compared with that in the other cases.

42. The module according to claim 36, wherein said temperature detection means is provided outside said stacked heating elements.

43. The module according to claim 36, wherein said temperature detection means has been embedded in said stacked heating elements.

44. The module according to claim 36, wherein a flat heat conduction plate is provided between each two of said plurality of heating elements.

45. The module according to claim 42, wherein said temperature detection means is provided on the uppermost surface of said stacked heating elements.

* * * * *

UNITED STATES PATENT AND TRADEMARK OFFICE
CERTIFICATE OF CORRECTION

PATENT NO. : 6,911,627 B2  
APPLICATION NO. : 10/365552  
DATED : June 28, 2005  
INVENTOR(S) : Takefumi Oguma and Nobutaka Watanabe It is certified that error appears in the above-identified patent and that said Letters Patent is hereby corrected as shown below:

Col. 19, Line 33 delete "arid", insert --and--

Signed and Sealed this

Fifth Day of September, 2006

JON W. DUDAS  
*Director of the United States Patent and Trademark Office*